United States Patent [19]

Nakayama et al.

[11] Patent Number: 5,915,254
[45] Date of Patent: *Jun. 22, 1999

[54] FILE STORING SYSTEM FOR MANAGING A RELATIONAL DATA BASE INCLUDING INFORMATION OF A PARENTAL RELATIONSHIP

[75] Inventors: Masayuki Nakayama; Yukiyasu Kobayashi; Yasuhiro Suzuki, all of Oyama, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/524,420

[22] Filed: Sep. 6, 1995

[30] Foreign Application Priority Data

Oct. 20, 1994 [JP] Japan .................................. 6-255231

[51] Int. Cl.⁶ .................................................. G06F 17/00
[52] U.S. Cl. ........................ 707/203; 707/201; 707/101; 707/102; 707/103
[58] Field of Search .................................. 395/602, 612, 395/616, 621; 707/1–206

[56] References Cited

U.S. PATENT DOCUMENTS

| | | | |
|---|---|---|---|
| 4,827,462 | 5/1989 | Flannagan et al. | 369/32 |
| 4,961,139 | 10/1990 | Hong et al. | 364/200 |
| 5,058,002 | 10/1991 | Nakamura et al. | 364/200 |
| 5,295,256 | 3/1994 | Bapat | 395/500 |
| 5,418,949 | 5/1995 | Suzuki | 395/621 |
| 5,448,726 | 9/1995 | Cramsie et al. | 395/614 |
| 5,448,727 | 9/1995 | Annevelink | 395/612 |
| 5,649,192 | 7/1997 | Stucky | 395/614 |
| 5,659,736 | 8/1997 | Hasegawa et al. | 395/611 |

FOREIGN PATENT DOCUMENTS 6-110744  4/1994  Japan .

*Primary Examiner*—Thomas G. Black
*Assistant Examiner*—David Yiuk Jung
*Attorney, Agent, or Firm*—Helfgott & Karas, P.C.

[57] ABSTRACT

A file storing system for management of a relational data base compiles records by connecting closely each other in a data storing file, according to the relationship of master and slave records expressing each instance of data and load records of a module unit. The file storing system comprises a relation definition file, a data page file, a data page, a page map file, and a meta map file. The file storing system further comprises a first means for managing the relationship of master and slave records, a second means for managing data pages, a third means for managing data maps, a fourth means for managing meta maps, and executes inserting or removing the records belonging to the relations and modules, loading the records of a module unit to a main data storage device, and further scanning a record unit via the relations.

18 Claims, 28 Drawing Sheets

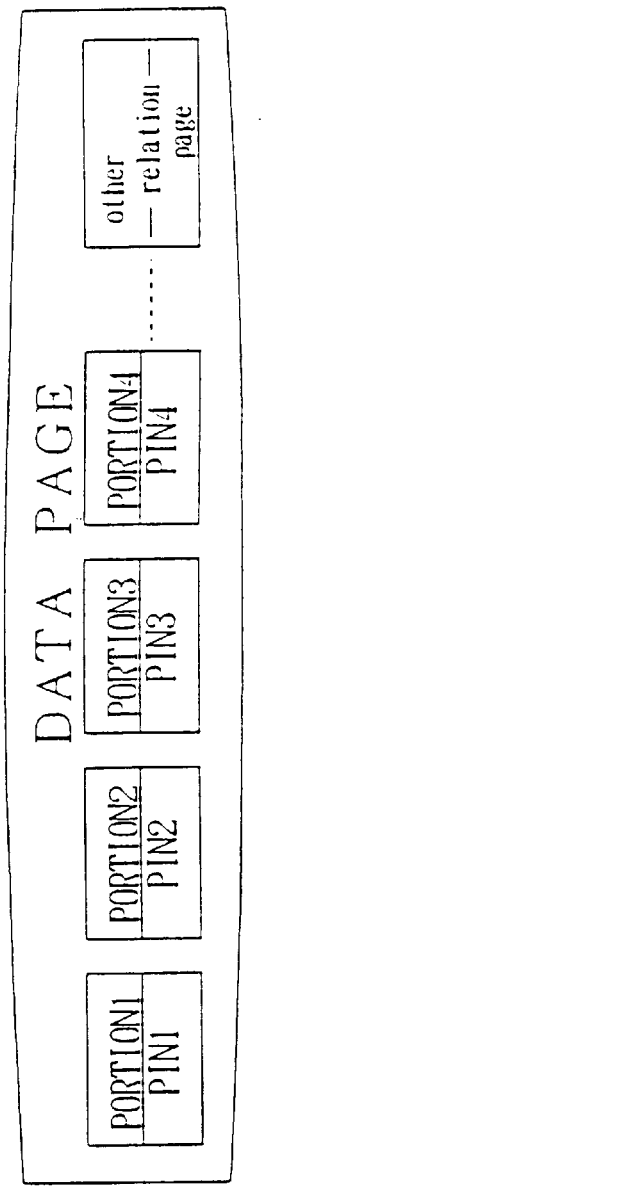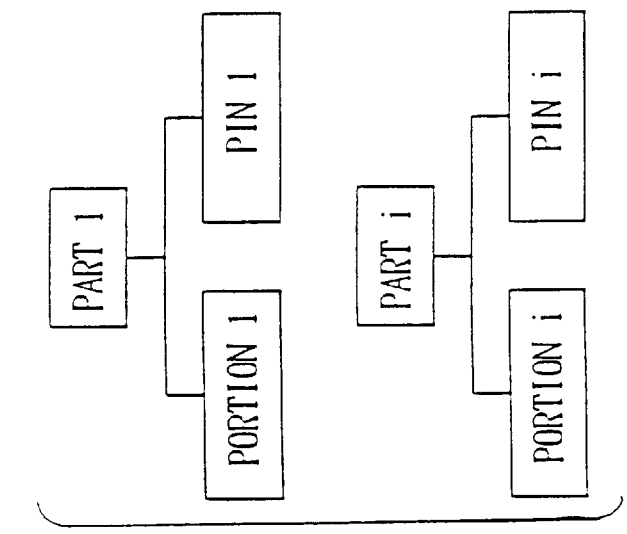
FIG.5B
FIG.5A

| NET NO. | | — 90 |
|---|---|---|
| A | — | 3 |
| B | — | 1 |
| C | — | 1 |

FIG.11A

META MAP (MMAP) — 115

| PMAP ADDRESS | 1 | 2 | 3 | 4 | 5 |
|---|---|---|---|---|---|
| NUMBER OF EMPTY PAGES | 0 | 1 | 1 | 0 | 4 |

PAGE MAP (PMAP) — 114

| PMAP ADDRESS | 1 | | | | 2 | | | | 3 | | | | 4 | | | | 5 | | | |
|---|---|---|---|---|---|---|---|---|---|---|---|---|---|---|---|---|---|---|---|---|
| DATA PAGE ADDRESS | 1 | 2 | 3 | 4 | 5 | 6 | 7 | 8 | 9 | 10 | 11 | 12 | 13 | 14 | 15 | 16 | 17 | 18 | 19 | 20 |
| MASTER RECORD/Rid | 1 | 1 | 1 | 1 | 2 | 2 | 2 | 0 | 3 | 3 | 1 | 0 | 4 | 4 | 1 | 1 | — | — | — | — |
| RELATION id | 1 | 1 | 3 | 2 | 1 | 2 | 1 | 0 | 1 | 2 | 3 | 0 | 1 | 2 | 1 | 1 | — | — | — | — |
| EMPTY RECORD INFORMATION | 0 | 0 | 0 | 0 | 0 | 0 | 0 | 4 | 0 | 0 | 0 | 4 | 0 | 0 | 0 | 0 | — | — | — | — |

※ · RELATION — 1: PIN   · EMPTY RECORD INFORMATION — NUMBER OF EMPTY RECORDS (FIXED LENGTH) OR
    2: PORTION        SIZE OF EMPTY RECORDS (VARIABLE LENGTH)
    3: PROPERTY OF A PART

FIG.11C

DATA PAGE — 112

| DATA PAGE ADDRESS | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| DIRECTORY 110 | PARTS 1 | 1 | 1 | 1 | 2 | 2 | 2 | EMPTY | PARTS 3 | 3 | 1 | EMPTY | PARTS 4 | 4 | 1 | 1 | EMPTY | | | |
| RELATION | PIN | PIN | PROPERTY | PORTION | PIN | PORTION | PIN | EMPTY | PIN | PORTION | PROPERTY | EMPTY | PIN | PORTION | PIN | PIN | EMPTY | | | |

| DI NAME | Used PMAP address | RMASK (BIT LOCATION: CORRESPONDING TO RELATION NO. | | | | |
|---|---|---|---|---|---|---|
| | | 1 | 2 | 3 | 4 | 5 |
| PARTS | 1 | 1 | 0 | 0 | 0 | 0 |
| | 4 | 0 | 1 | 0 | 0 | 0 |
| | 7 | 0 | 0 | 0 | 0 | 1 |
| | 8 | 1 | 1 | 0 | 0 | 1 |
| SYMBOL | 2 | 0 | 0 | 1 | 0 | 0 |
| | 5 | 0 | 0 | 1 | 0 | 0 |
| NET | 3 | 0 | 0 | 0 | 1 | 0 |
| | 6 | 0 | 0 | 0 | 1 | 0 |

FIG.19

| PAGE MAP | | |
|---|---|---|
| PMAP | DP | R |
| 1 | 1 ~ 4 | 2 |
| 2 | 5 ~ 8 | 5 |
| 3 | 9 ~ 12 | 7 |
| 4 | 13 ~ 16 | 3 |
| 5 | 17 ~ 20 | 5 |
| 6 | 21 ~ 24 | 7 |
| 7 | 25 ~ 28 | 2, 3 |
| 8 | 29 ~ 32 | 1, 2, 5 |

FIG.20A

[DIRECT RELATION AND PART]
- loading part pin (relation No. 1)

| PMAP | 1 | 4 | 7 | 8 | PAGE FOR |
|------|---|---|---|---|----------|
| RMSK | 1 | 0 | 0 | 1 | LOADING  |

- loading portion (relation No. 2)

| PMAP | 1 | 4 | 7 | 8 | PAGE FOR |
|------|---|---|---|---|----------|
| RMSK | 0 | 1 | 0 | 1 | LOADING  |

- loading property of a part (relation No. 5)

| PMAP | 1 | 4 | 7 | 8 | PAGE FOR |
|------|---|---|---|---|----------|
| RMSK | 0 | 0 | 1 | 1 | LOADING  |

- loading property of a part (relations No. 1, 2, 5)

| PMAP | 1 | 4 | 7 | 8 | PAGE FOR |
|------|---|---|---|---|----------|
| RMSK | 1 | 1 | 1 | 1 | LOADING  |

FIG.20B

[DIRECT RELATION SYMBOL]
- loading property of a part (relation No. 3)

| PMAP | 2 | 5 | PAGE FOR |
|------|---|---|----------|
| RMSK | 1 | 1 | LOADING  |

FIG.20C

[DIRECT RELATION NET]
- loading path (relation No. 4)

| PMAP | 3 | 6 | PAGE FOR |
|------|---|---|----------|
| RMSK | 1 | 1 | LOADING  |

FIG.21

| DATA PAGE | | | | |
|---|---|---|---|---|
| DP ADDRESS | | R | | PMAP |
| 1 | 2 | 1 | 1 | 1 |
| 3 | 4 | 1 | 1 | |
| 5 | 6 | 3 | 3 | 2 |
| 7 | 8 | 3 | 3 | |
| 9 | 10 | 4 | 4 | 3 |
| 11 | 12 | 4 | 4 | |
| 13 | 14 | 2 | 2 | 4 |
| 15 | 16 | 2 | 2 | |
| 17 | 18 | 3 | 3 | 5 |
| — | — | — | — | |
| 21 | 22 | 4 | 4 | 6 |
| 23 | — | 4 | — | |
| 25 | 26 | 5 | 5 | 7 |
| 27 | — | 5 | — | |
| 29 | 30 | 1 | 2 | 8 |
| 31 | 32 | 5 | — | |

FIG.23
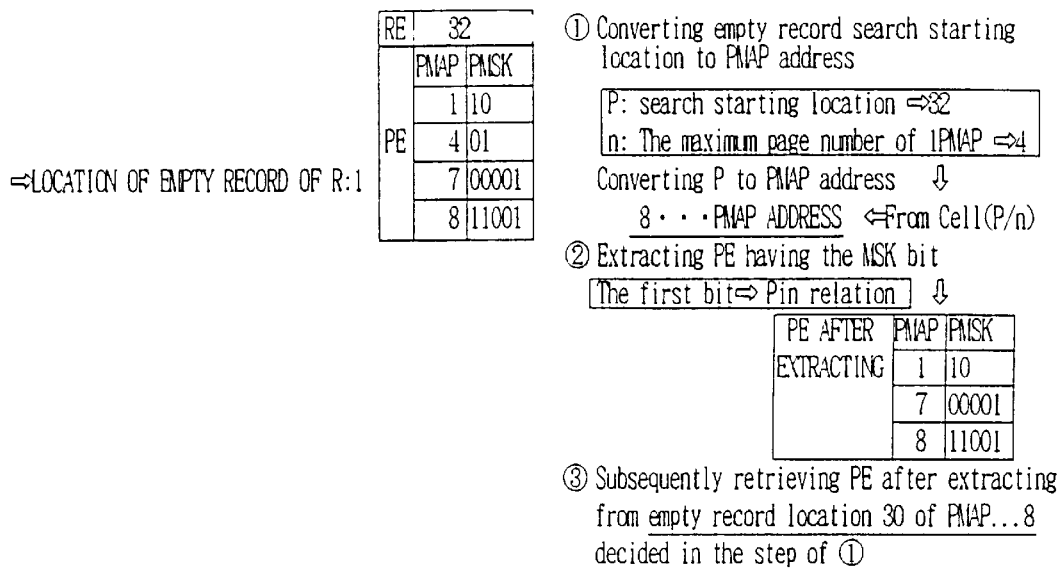
① Converting empty record search starting location to PMAP address
② Extracting PE having the MSK bit
③ Subsequently retrieving PE after extracting from empty record location 30 of PMAP...8 decided in the step of ①
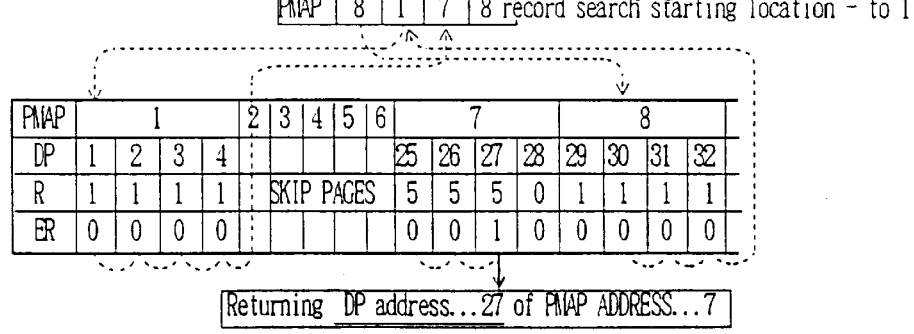
<CASE 1>
There is an empty address in PMAP of page location management.
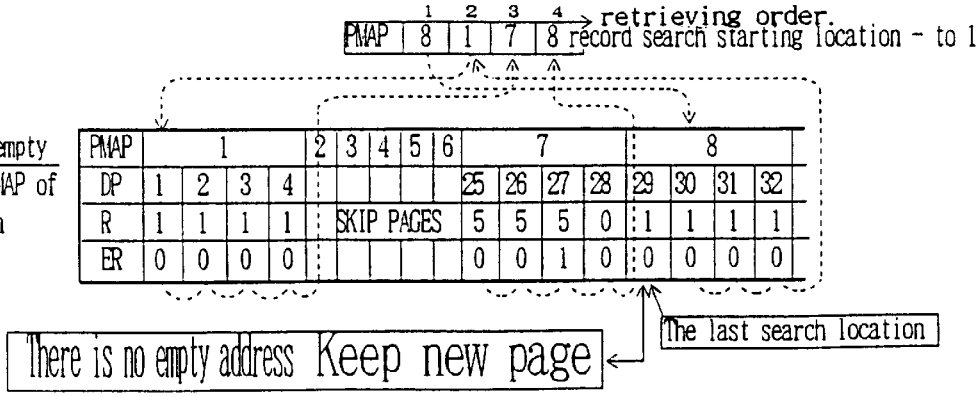
<CASE 2>
There is no empty address in PMAP of page location management.

FIG.24

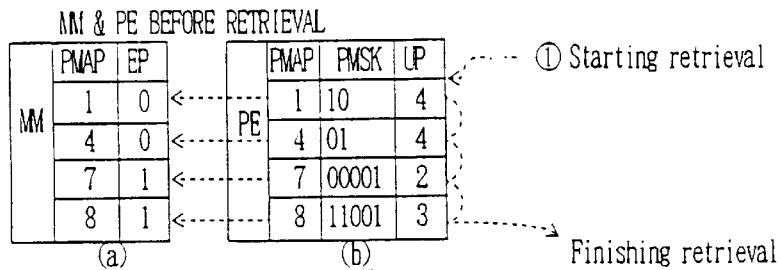

MM & PE BEFORE RETRIEVAL

① Starting retrieval
Finishing retrieval

① The page location management having the empty page number page number is selected from the meta map

| PMAP1 ⇒ Empty page number/0 |
| PMAP2 ⇒ Empty page number/0 |
| PMAP3 ⇒ Empty page number/1 |
| PMAP4 ⇒ Empty page number/1 |

⇒

AFTER EXTRACTING

| | PMAP | PMSK | UP |
|---|---|---|---|
| PE | 7 | 00001 | 2 |
| | 8 | 01001 | 3 |

② In the page location management after extracting, the page location management having the largest number of the used page number is used as the decided page
③ Updating the PMAP
④ Updating the meta map and the page location management

MM & PE AFTER RETRIEVAL

| | PMAP | EP |
|---|---|---|
| MM | 1 | 0 |
| | 4 | 0 |
| | 7 | 0 |
| | 8 | 0 |

(e)

| | PMAP | PMSK | UP |
|---|---|---|---|
| PE | 1 | 10 | 4 |
| | 4 | 01 | 4 |
| | 7 | 00001 | 2 |
| | 8 | 11001 | 4 |

(f)

PAGE MAP BEFORE RETRIEVAL

| PMAP | DP | | DI | | R | |
|---|---|---|---|---|---|---|
| 1 | 1 | 2 | 1 | 1 | 1 | 1 |
| | 3 | 4 | 1 | 1 | 1 | 1 |
| 2 | 5 | 6 | 2 | 2 | 3 | 3 |
| | 7 | 8 | 2 | 2 | 3 | 3 |
| 3 | 9 | 10 | 3 | 3 | 4 | 4 |
| | 11 | 12 | 3 | 3 | 4 | 4 |
| 4 | 13 | 14 | 1 | 1 | 2 | 2 |
| | 15 | 16 | 1 | 1 | 2 | 2 |
| 5 | 17 | 18 | 2 | 2 | 3 | 3 |
| | 19 | 20 | - | - | - | - |
| 6 | 21 | 22 | 3 | 3 | 4 | 4 |
| | 23 | 24 | 3 | - | 4 | - |
| 7 | 25 | 26 | 1 | 1 | 0 | 5 |
| | 27 | 28 | 1 | - | 5 | - |
| 8 | 29 | 30 | 1 | 1 | 2 | 2 |
| | 31 | 32 | 1 | - | 5 | - |

(c)

(d)

CHANGED SECTION AFTER RETRIEVAL

FIG.26

(i) (i)
Remove (identification of master record, record identification/Rid)

- Locating to directory · locate
  S60
- Deleting records in a page (number of efficient records -1)

- Updating empty record information of the page in PMAP (number of efficient records + 1)

- Making empty records and masks of PMAP in the page location to ON (1)
  - There is a case where the mask has been already made to ON (1)
    More particularly, the case where an empty record is generated at first time in all pages of the relation in the PMAP

- There is no empty record (no efficient record)?  S61
  YES
  - Deleting the page information in PMAP
  - Number of the empty pages in meta map + 1
  - Number of the used pages for the PMAP in the page location - 1
  - The used page of page existence is empty (the used page number = 0)?  S62
    YES — Deleting the arrangement of the PMAP in the page location
    - There is no page of the relation in the page map?  S63
      YES — Making the page mask to the relation of the page map of page existence and the empty record mask to OFF (0)

| 1 | RELATIONAL DATA BASE (RDB) |
| 2 | RDB + SECONDARY INDEX (B-TREE etc) |
| 3 | NETWORK TYPE DATA BASE |
| 4 | DATA MANAGEMENT BY DIRECTORIES (P oetc) |

↓
There is a tendency to disperse the locations for storing data
↓
The times reqired for accessing to the secondary data storage device are increased
↓
Accessing time is increased

FILE STORING SYSTEM FOR MANAGING A RELATIONAL DATA BASE INCLUDING INFORMATION OF A PARENTAL RELATIONSHIP

BACKGROUND OF THE INVENTION

1. Field of the Invention

The present invention relates to a file storing system for a relational data base, of which clustering is accelerated. More particularly, it relates to a file storing system, which provides capability of accessing each relation that expresses a set corresponding to a data type and capability of formation of closely connecting data in a data storing file, according to the relationship of master and slave records expressing each instance of data.

2. Description of the Related Art

In a field of engineering application, such as CAD (Computer Aided Design), when employing a data base, there is modularity between data. It is required to process the data processing for a module unit with a high speed.

Meanwhile, a relational database managing system (RDBMS) can retrieve a large amount of data, such as SQL (Structured Query Language), with wide variety of items according to the circumstances (adhoc).

However, the RDBMS is considered applicable to only a field of business application to process homogeneous data, such as employee information, but not to a field of engineering application.

A record, which is a unit of data handled by an application program, or a tuple respectively having a uniform type and a class, express what kind of a field of data items records are formed with.

The RDBMS manages a set of records with a unit, which is the so-called relation, adaptive to the type or the class. Accordingly, the RDBMS can apply a uniform search condition to the wide variety of records belonging to one relation.

It is also required when expressing a modularity, such as the relationship of master and slave records, to retrieve data by the means of one key, which identifies a module unit. In this case, the accessing operation to a module unit is too slow.

It has been proposed to access to the module unit with a high speed by providing secondary index, such as a Hash code, B (Balanced)-tree, or the like, instead of an identifying key of each record in the RDBMS (refer to U.S. Pat No. 4,961,139 and U.S. Pat. No. 5,058,002).

Here, the Hash code keeps data areas based on one key, and hangs the data down, based on the location of the key. Further, the B-tree hangs data down by the use of a tree code, which is distributed by one key. The B-tree stores data by dividing into the plural. Therefore, there is an advantage to reduce the required time half when retrieving, if the data is divided into two.

However, when records in a module unit complied with a secondary indexes are physically dispersed, and stored and located on the secondary storage device, accessing to data also becomes too slow, even if a system employs the Hash code or the B-tree, as described above.

Further, there is a method for expressing the relationship between specified records, such as module units, by the use of an address link between records. The method is, for example, a network type database management system. In this method, data are linked with a link relationship, and the data are accessed in order.

However, it is not always that record groups linked to addresses are physically located neighborhood in this case, too.

Accordingly, it is required for realizing the capability to access the module unit with a high speed to physically locate and neighbor the record groups, according to the relationship of master and slave records. To overcome the above described drawbacks, there is a method for providing a directory, which expresses physical storing and managing information of the module unit, such as a partitioned organization file (refer to U.S. Pat. No. 4, 827,462 and U.S. Pat. No. 5,058,002).

In this method, it becomes possible to locate and neighbor record groups of a module unit within a page area by linking an address of the page area for storing a plurality of the record groups, which form the module unit, from a directory.

However, in this case, all records can be accessed within only the page of which address is linked per a module, i.e., a page, to which each address of each directory is linked, and the records stored in the page. In other words, all records can be accessed via the directory. Therefore, records cannot be accessed via a relation, such as the RDBMS. Further, it is difficult to locate and neighbor the own page (or fellow pages) storing the records, as the page is expressed with a page address link on the directory. It is the utmost to locate the page close to an immediately previous page area.

Accordingly, the information of the module unit stretches over a plurality of pages. Therefore, if pages are inserted or deleted due to the frequent insertion and deletion of records, storing locations of the pages are dispersed.

FIG. 29 is an explanatory diagram of the conventional file storing methods, as described above. Even with employing every methods, there is a tendency to disperse the locations for storing data, when storing the data to a secondary data storage device 1, as explained above and shown in FIG. 30. As the result, the times required for accessing to the secondary storage device 1 are increased. That brings an increase of accessing time.

The applicant of the present invention has proposed a clustering method for storing and neighboring the records, based on the relationship between relations with consideration of the above-described prior arts (Japanese patent No. 6-110744, which is corresponding to U.S. patent Ser. No. 129,853), now U.S. Pat. No. 5,418,949.

A In the proposed method, the adjacent relation is led according to uniform type or class of data. The method is suitable for data management in data processing, such as simulation or circuit composition in a circuit design CAD, which reads data per a kind of data totally and requires a large amount of calculations.

However, it is not enough, even if the method disclosed by the applicant of the present invention is employed, when requiring to locally access per an instance of data, such as a library information of parts. It further requires detailed clustering, i.e., clustering of slave records, such as a portion or a pin, which is subordinate per a record of a main part.

SUMMARY OF THE INVENTION

Accordingly, it is an object of the present invention to provide a file storing system for a relational data base, which is unique and useful to overcome the above-described drawbacks in the conventional systems.

It is an another object of the present invention to provide a file storing system for a relational data base, which employs a clustering method for managing adjacent storing, according to each modularity as an instance of data.

It is still another object of the present invention to provide a file storing system for a relational data base, which effectively improves the clustering relating to pages storing a record group, i.e., a module unit.

It is a further object of the present invention to provide a file storing system for a relational data base, which can improve to access per a relation expressed a set corresponding to a type of data and compiling by being close each other in the data storing file, according to the relationship of master and slave between records expressing each instance of data.

Other objects and advantages of the present invention will become apparent from the detailed description to follow taken in conjunction with the appended claims.

BRIEF DESCRIPTION OF THE DRAWINGS

FIGS. 5A and 5B are diagrams for explaining clustering based on an instance of module.

FIGS. 11A, 11B and 11C show the relationship of a meta map, a page map and data page.

FIG. 18 shows an entire table illustrating a page location.

FIG. 19 shows an entire table of a page map.

FIGS. 20A, 20B and 20C are diagrams for explaining a condition of loading a module unit.

FIG. 21 is a diagram showing a condition of a data page.

FIG. 23 is a diagram showing a condition of retrieving empty records on the step of inserting processing.

FIG. 24 is a diagram showing conditions of a new page location and an existing page map on the step of inserting processing.

FIG. 26 is an operational flow chart of removing.

FIG. 27 is a diagram (No. 1) showing a condition on the step of removing processing.

FIG. 29 is an explanatory diagram of the conventional data file storing system.

DESCRIPTION OF THE PREFERRED EMBODIMENTS

Figure 1:
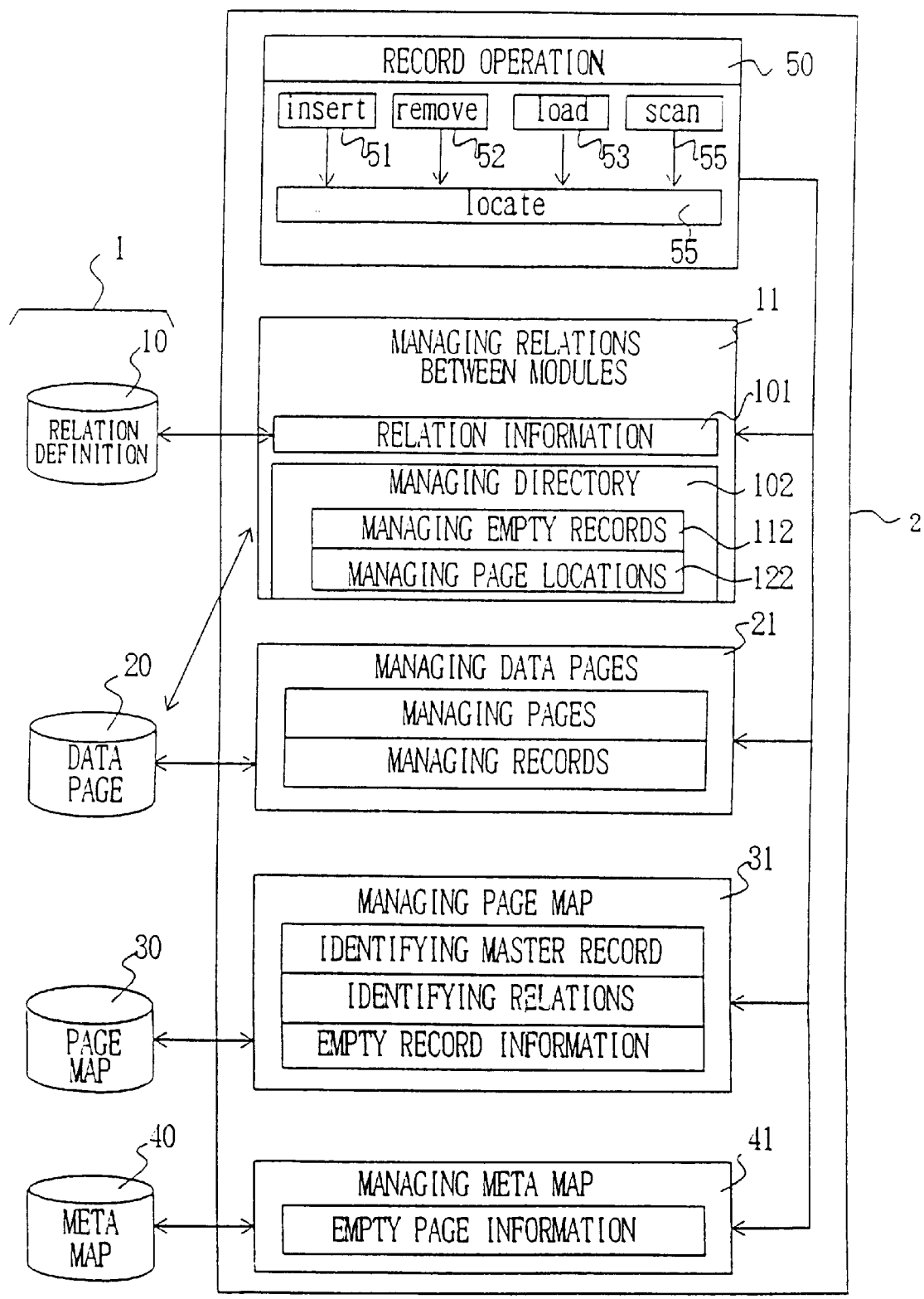
FIG. 1 is an explanatory diagram of a principle according the present invention.

FIG. 1 is an explanatory diagram of a principle according to the present invention. Throughout the following descriptions, the same reference numerals are used to denote and identify corresponding or identical components. At first, to understand the present invention, a principle of the present invention and a concept of clustering will be explained in accompanying with FIG. 1.

Figure 2:
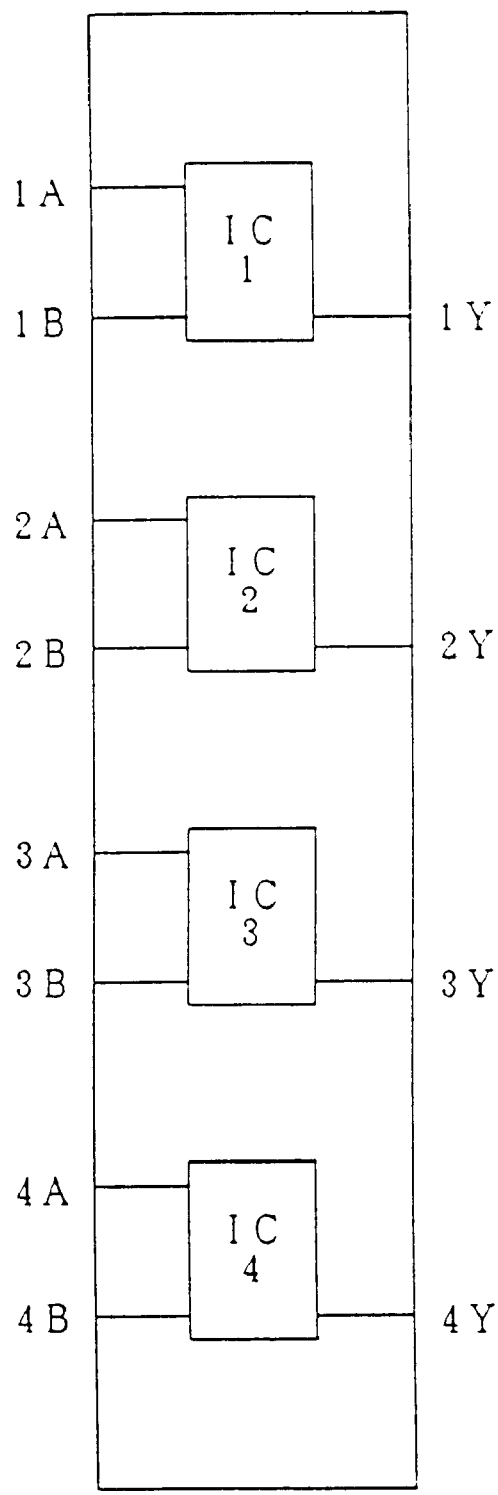
FIG. 2 is a diagram for explaining one example of an IC part.

FIGS. 2 to 9 are diagrams for explaining clustering by employing an IC component as an example. FIG. 2 is a diagram for explaining a concept of clustering by employing the IC component (Quad 2-Input NAND Gates) as an example.

Considering an IC component as shown in FIG. 2, the IC component has four IC elements IC1 to IC4, each of which has three signal pins, i.e., total 12 pieces of signal pins.

Figure 3:
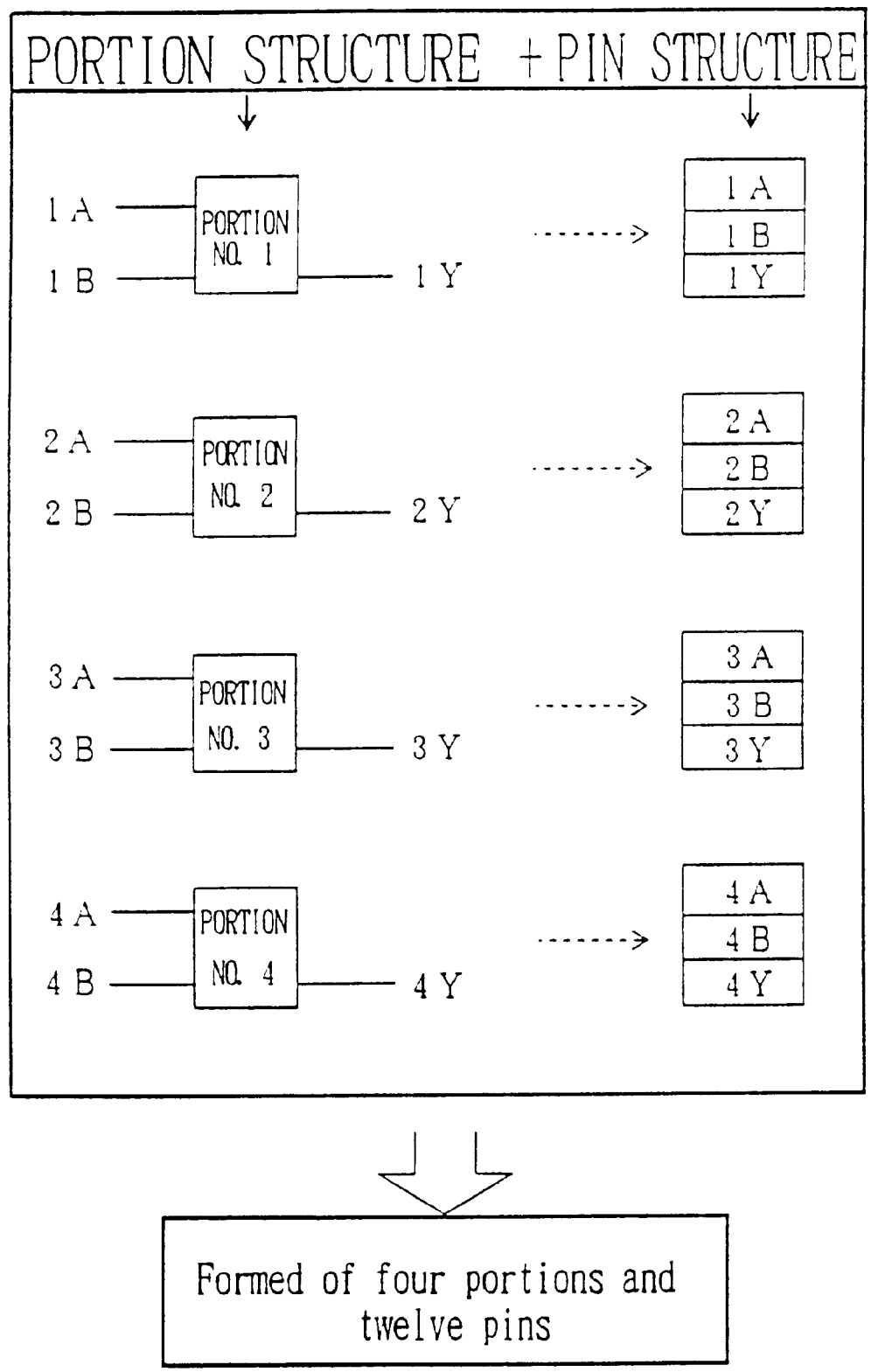
FIG. 3 is a diagram for explaining a portion and a pin structures based on clustering.

As shown in FIG. 3, four IC elements IC1 to IC4 are now called as "portions". The four IC elements IC1 to IC4 are numbered 1 to 4 in order. As a pin structure, the portion number 1 has pin numbers 1A, 1B and 1Y, the portion number 2 has pin numbers 2A, 2B and 2Y, the portion number 3 has pin numbers 3A, 3B and 3Y, and the portion number 4 has pin numbers 4A, 4B and 4Y, respectively.

In a method of clustering previously proposed in U.S. Pat. No. 5,418,949 by the applicant of the present invention, an IC component is considered as having parts, which are totally read into a main data storage device per a kind of the data according to an uniform type or class of data. In this case, the arrangement of the data is as shown in FIGS. 4A and 4B.

Figure 4B:
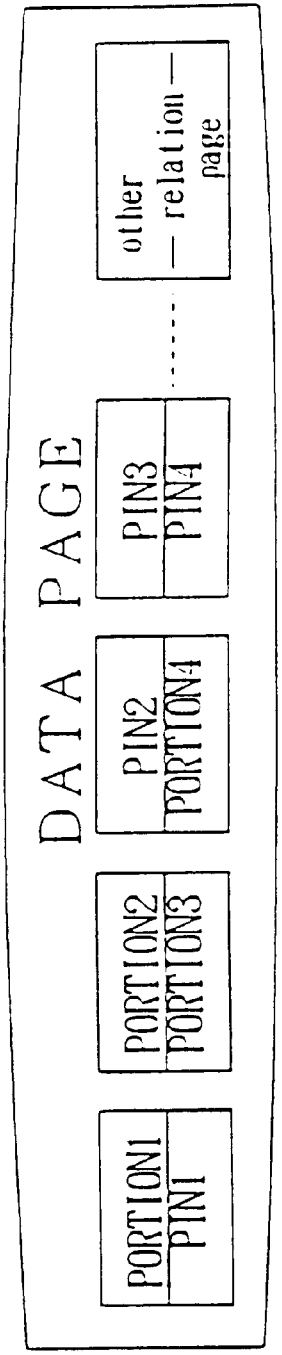
FIGS. 4A and 4B are diagrams for explaining clustering according to a relation based on a record and a tuple (type/class).
Figure 4A:
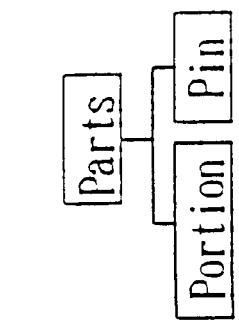

However, in the arrangement of the data shown in FIGS. 4A and 4B, when employing one portion as an element and accessing to data (pin data or the like) linking to the element, data linking to other portions are also referred, so that the overhead becomes too large.

Clustering of information of a parental relationship according to the present invention, as shown in FIGS. 5A and 5B, is performed based on an instance of a module. In other words, the IC is not compiled as one part, and a plurality of parts 1 to i composing the IC are classified individually. For example, in the example of the parts shown in FIG. 2, the IC elements IC1 to IC4 are classified individually.

Thereby, the adjacent storing can be managed according to each modularity of instances of data by the present invention.

Figure 6:
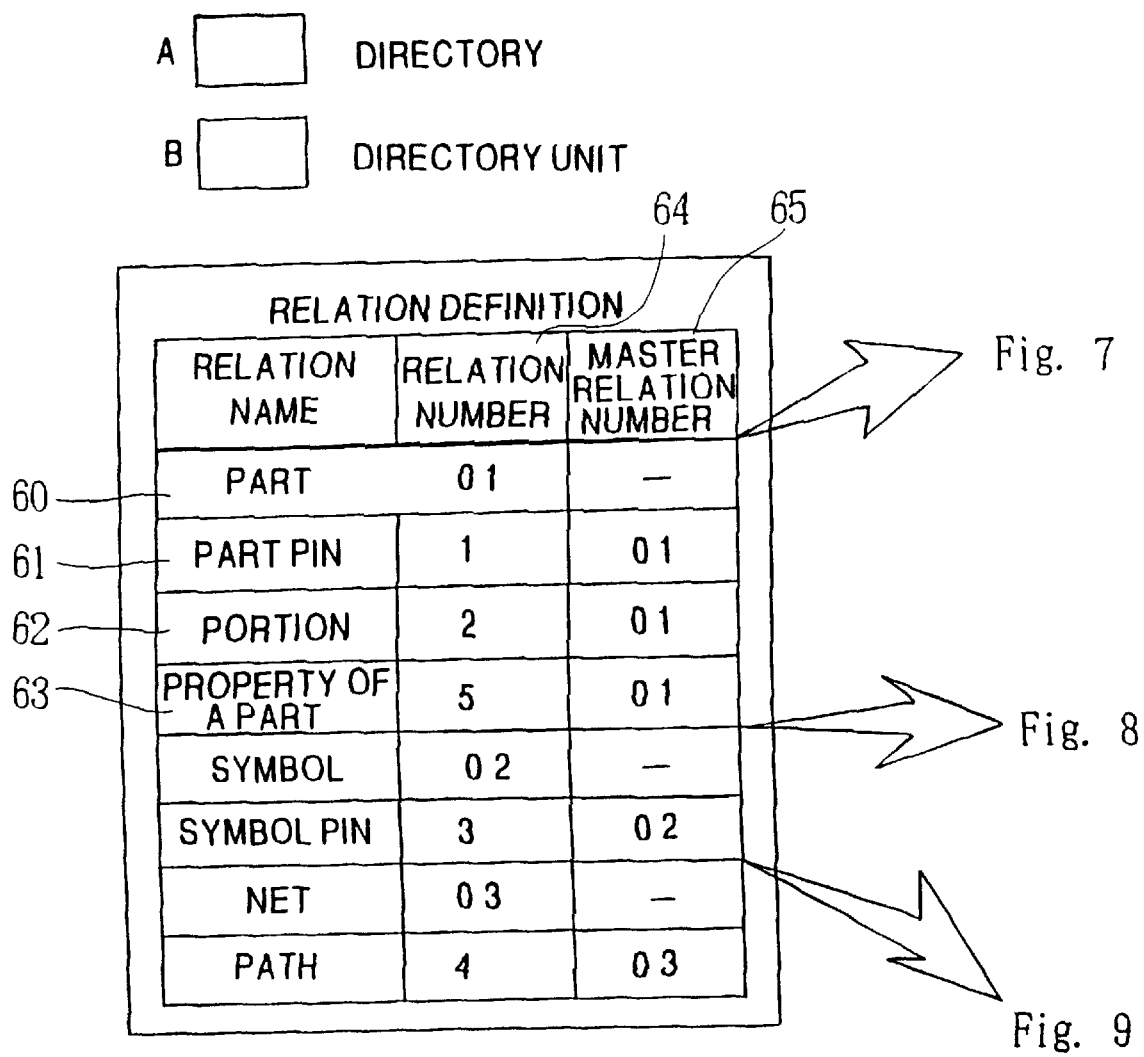
FIG. 6 is a diagram for explaining the relationship of master and slave relations.
Figure 7A:
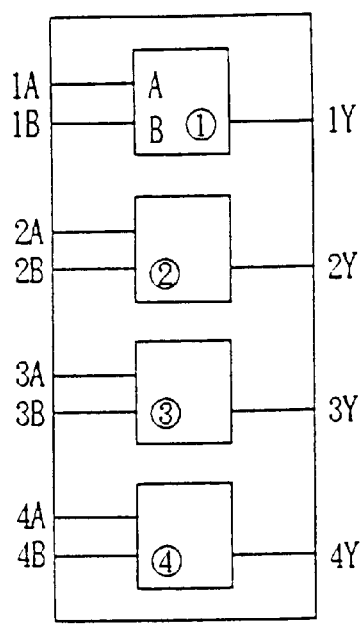
FIGS. 7A and 7B are diagrams for explaining a structure of IC parts.
Figure 7B:
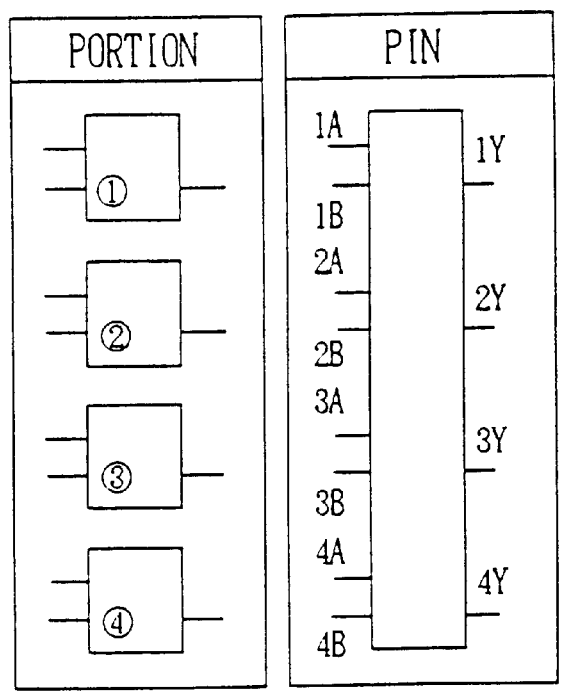

FIG. 6 is a diagram for explaining definition of the relationship of master and slave relations of data located adjacent according to each modurality. A relation name, a relation number, and a master relation number are defined in a relation definition table.

In FIG. 6, dotted sections a mean directories, under of which each directory unit b is subordinate. For example, a part pin 61, a portion 62 and a property of a part 63 are subordinate to a part directory 60.

The relation number 64 is a main identifier, and the main relation number 65 is an identifier, which identifies the main identifier. Accordingly, the relation number 01 of the part directory 60 corresponds to the main relation number 01 of a part pin 61, a portion 62, and a property of a part 63, which are directory units under the main directory. The relation is corresponding among these directories, so that the relationship shown in FIGS. 7A and 7B can be obtained.

Figures 8, 9:
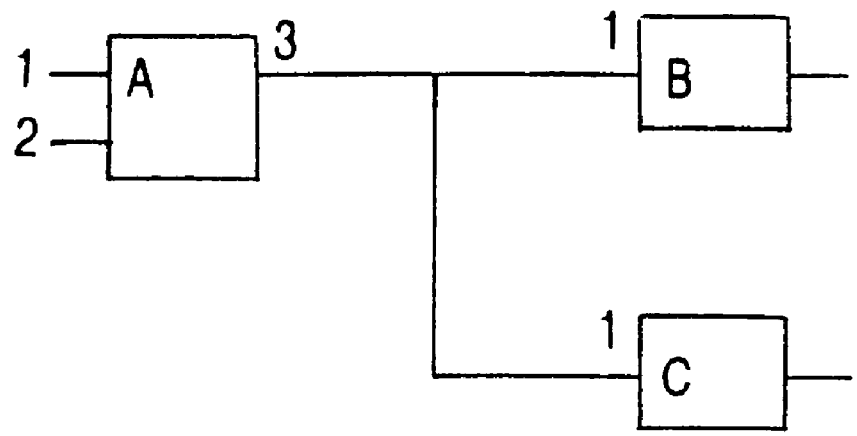
FIG. 8 is a diagram for explaining a symbol pin.
FIG. 9 is a diagram for explaining the relationship of connecting symbol pins.

FIG. 8 shows a symbol pin, which is a directory unit under a symbol directory. Further, FIG. 9 shows a relationship between a portion and a symbol pin connected to a net number 90, according to the net directory and a path directory unit.

Returning back to FIG. 1, a secondary data storage device 1 stores a data base as a relation definition file 10, a data page file 20, a page map file 3, and a meta map file 40.

The relation definition file 10 of the secondary data storage device 1 stores information of a parental relationship, which expresses a modularity between relations explained in FIG. 5A and 5B.

The data page file 20 stores data records belonging to a relation per a page unit. The page map file 30 stores page map information expressing location information in the data page and the data page file 20 of an empty page per a specified page unit.

More particularly, the data page file 20 stores records belonging to a relation and a module. Simultaneously, the data page file 20 has empty record areas re-used as effective records. The empty pages have no record, and are re-used per a page unit.

The meta map file 40 stores an empty page number as a condition of empty pages in each page map.

An arithmetic processor 2 including means 11 for managing the relationship of master and slave, i.e., relations between modules, manages the relation definition file 10 and the data page file 20. The arithmetic processor 2 further manages information 101 showing the relationship between relations and directory information 102, as shown in FIG. 6.

The directory information 102 expresses an address 112 showing a search starting page of the empty records in each relation belonging to the module, and an information table of a page map including a page belonging to the module. The information table of page map expresses information 122 of an address of the page map, a data page number, and the existences of pages and empty records for each relation.

The data page managing means 21 manages the data page file 20, the page map managing means 31 manages the page map file 30, and the meta map managing means 41 manages the meta map file 40, respectively.

A record operation means 50 operates the means 11 for managing the relation between modules, the data page managing means 21, the page map managing means 31, and the meta map managing means 41. The record operation means 50 further executes the operations of inserting 51 and deleting 52 for the records belonging to the relations and modules, loading 53 for the records to the main storage, and scanning 54 for the records belonging to the relation and modules, and further locating 55 for the module in common to the execution of the above-described operations (insertion, deletion, loading and scanning) is executed.

In the above-described structure, the present invention employs page map information extracted from the page map file 20 and directory information for managing information of page map, as shown in FIG. 6, which is stored in the relation definition file 10. Therefore, according to the present invention, it is possible to perform clustering of the pages storing the records in a module unit with a high speed.

Accordingly, it is possible to load the data records in a module unit to the main data storage device with a high speed. Further, it is also possible to operate the data records via the relation by identifying the relations corresponding per a page in the page map information, without the directory information.

Figure 10:
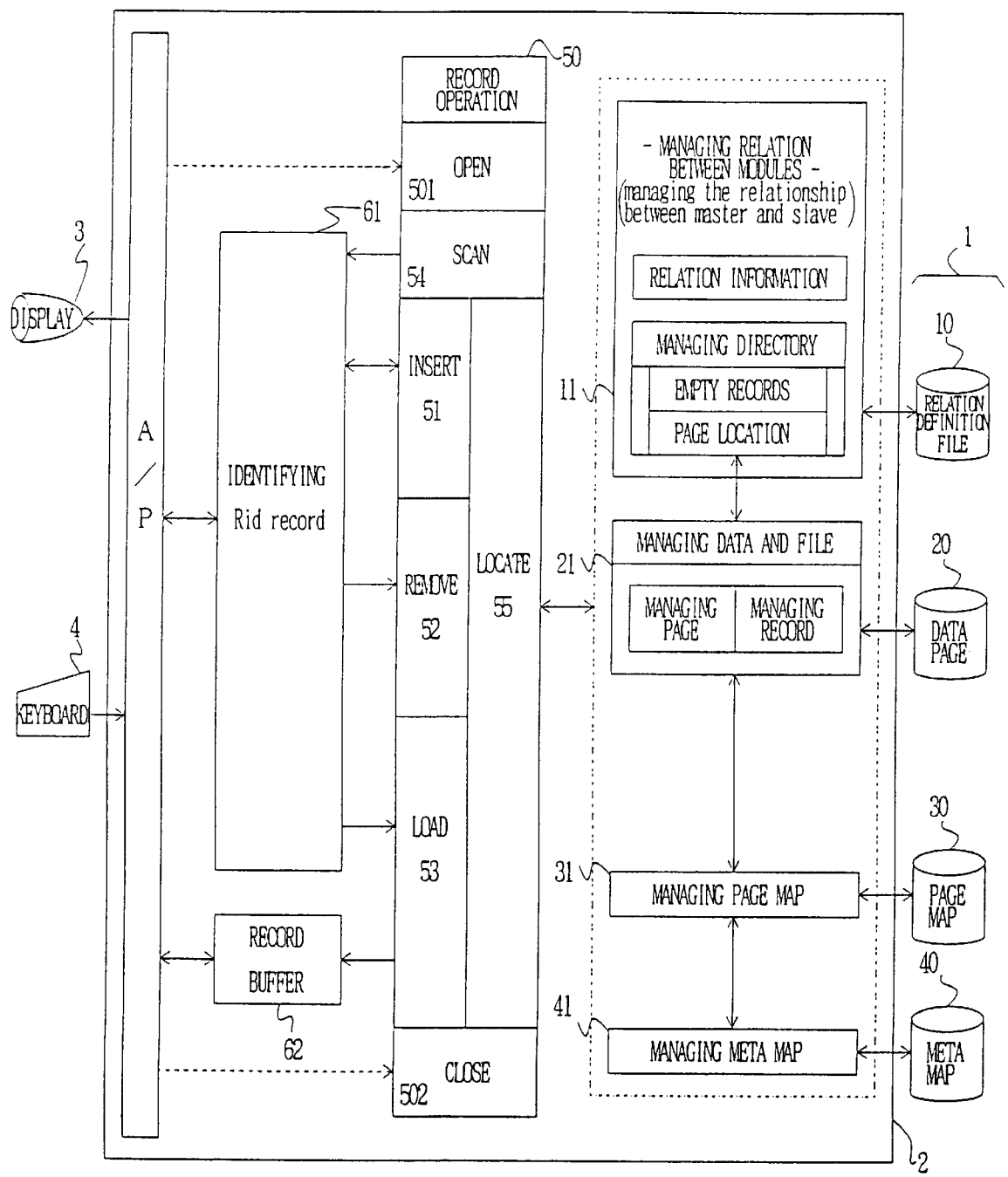
FIG. 10 is a block diagram of a structural example of the present invention.

FIG. 10 is a block diagram of an embodiment of the present invention. In FIG. 10, in comparison with a principle diagram shown in FIG. 1, an application processing section 60 provided with a display terminal 3 and a keyboard terminal 4 accesses to the data base of information of parts.

Further, in this embodiment, the arithmetic processor 2 includes a Rid (record ID: record address on data base) identifying circuit 61 and a record buffer memory 62.

Furthermore, the relation definition file, the data page file, the page map file and the meta map file form the data base. As described in FIG. 1, each of the files is stored in corresponding one of the file storing sections of the secondary data storage device 1, i.e., the relation definition file 10, the data page file 20, the page map file 30, and the meta map file 40, respectively.

The relation definition on the relation definition file 10 includes relation per a kind of data (type of data), relationship between relations, i.e., a relation ID (identification symbol), a record length, a main relation ID, a subordinate slave relation number or the like.

The data page file 20 stores records of data required for application processing. The file is divided in pages, which are units that are physically input and output. A same page stores only records belonging to one kind of relation.

The page map file 30 manages information showing whether or not a page unit composing the data page file is used. The file 30 groups a plurality of pages in each page map, according to the empty/used relation ID, the Rid of a main record expressing the relationship of master and slave, and an empty record information (empty record number). For example, four pages are used in one page map. The meta map file 40 manages the number of the empty pages as the empty pages in each page map.

More particularly, the relationship of meta map, page map and data page will be explained in accompanying with FIGS. 11A, 11B and 11C. FIGS. 11A, 11B and 11C are diagrams showing the relationship of the meta map, the page map, and the data page as one example.

The data page shown in FIG. 11C includes main records (for example, parts unit) and information of subordinate slave records in the directory 110 as a table.

For example, the relation 113 (a pin, a pin, a property of a part and a portion) is stored in the data page addresses 1 to 4, as subordinate slave records (having a relation), which are subordinate to the directory 111.

Further, the data map shown in FIG. 11B has information of data pages and information of empty records. For example, data page addresses 1 to 4 are corresponding to the page map address 114. The ID of the master record, which is a directory (parts: 1), the ID of the slave record having relations (pin: 1, pin: 1, a property of a part: 3, a portion: 2) and information of empty records (all is zero) are shown in the page map address. The empty record information is expressed with the number or the size of empty records.

Further, the meta map shown in FIG. 11A expresses numbers of empty pages. As is apparent from the comparison with the page map shown in FIG. 11B, for example, a page map address 1 shows that the empty page is 0, and the page map address 2 shows that the empty page is 1.

Figure 12:
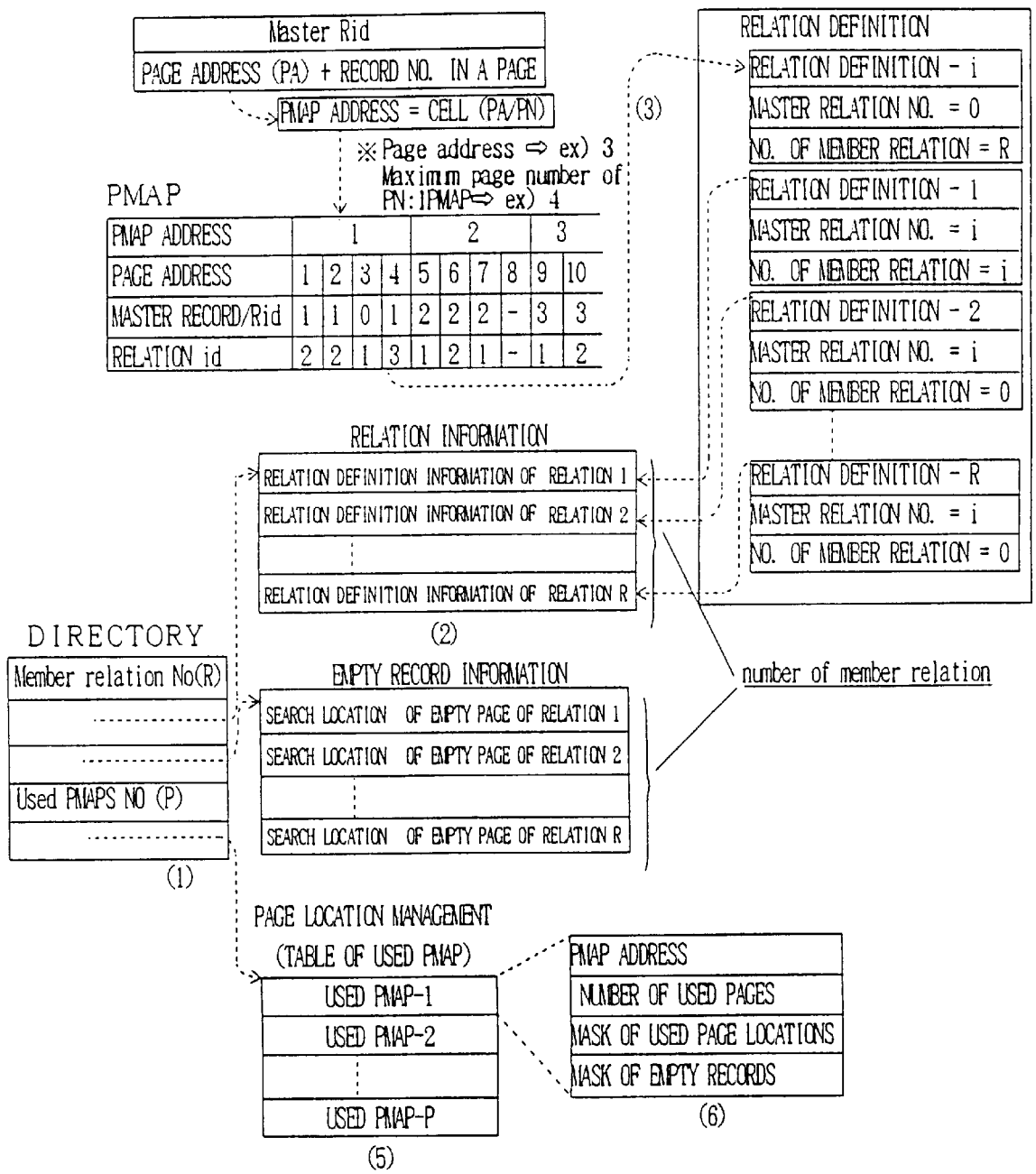
FIG. 12 is a diagram for explaining a data structure of a directory.

FIG. 12 shows a data structure of a directory. The data structure includes a member relation number (R), relational information, empty record managing information, a map number of the used page (P), and page location managing data, as data of a directory [refer to ① of FIG. 12].

The relational information includes a relation definition of the relation required for the number of member relations. Each relation definition includes a relation definition, a main relation number and a member relation number, as shown in ③ of FIG. 12, which are obtained from the page map.

The empty record management has empty page search location information required for the number of member relations, as shown in ④ of FIG. 12.

The page location management includes used page maps, as shown in ⑤ of FIG. 12. Each of the used page maps includes a page map address, a number of the used pages, a mask of the used page locations and a mask of empty records, as shown in ⑥ of FIG. 12.

Figure 13:
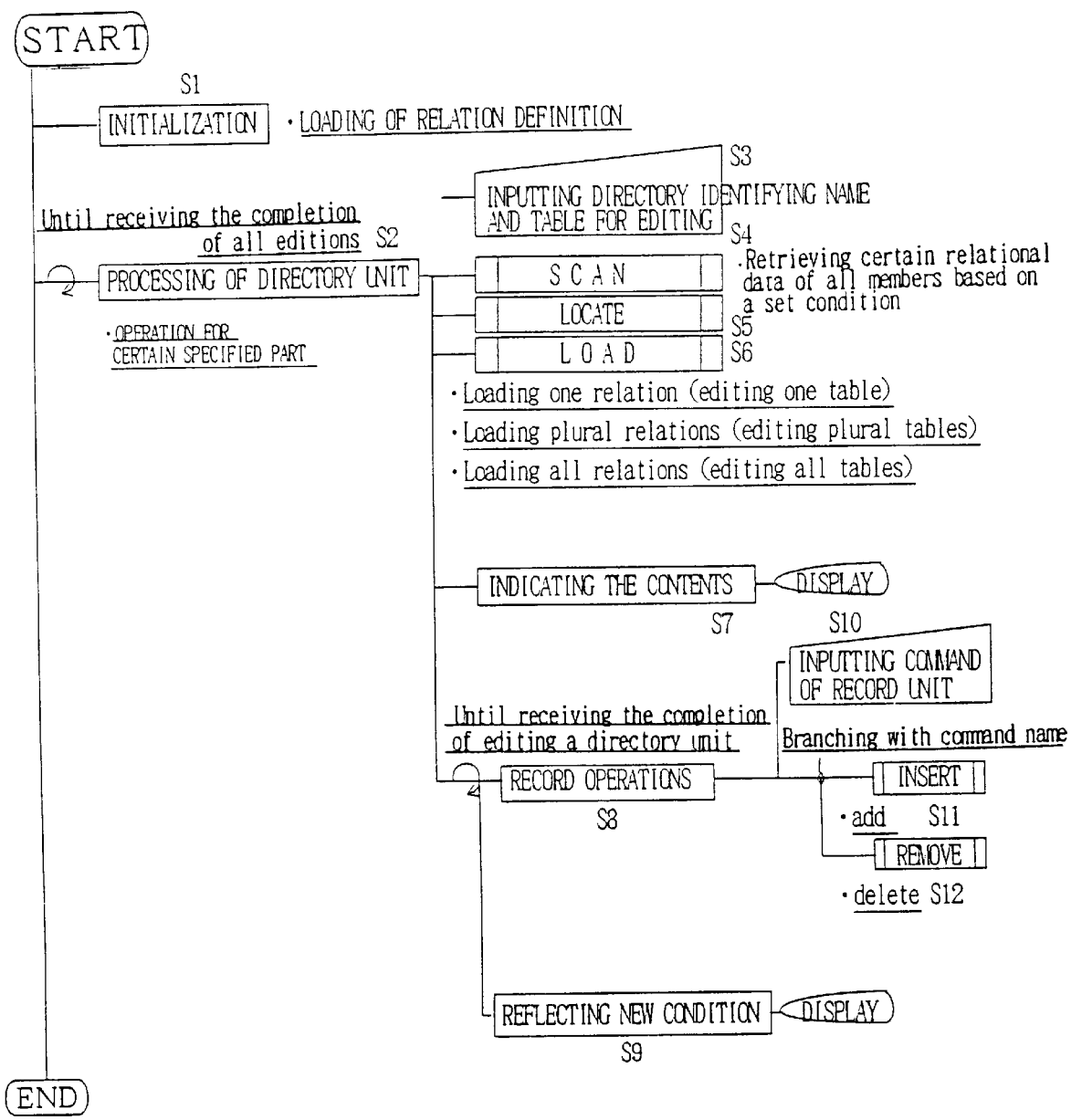
FIG. 13 shows an operational flow chart of the embodiment according to the present invention.

FIG. 13 is an operational flow chart of an entire system according to the present invention. At first, the relation definition is located from the relation definition file 10 on initialization of the system (STEP S1).

Secondly, the processing for a directory unit, i.e., certain specified part, is performed, until receiving the completion of all editions (STEP S2). On the processing of directory unit (STEP S2), a directory identifying name and a table for editing are inputted by the keyboard (STEP S3). Thereby, a kind of relation, a plurality of relations, and all slave relations (portion, pin, property of a part) are selected.

Further, in the operational flow chart shown in FIG. 13, certain relational data of all members are retrieved based on a set condition, by the scan processing of records (STEP S4). Then, location of data is performed by the locating processing (STEP S5).

Further, load processing of a module unit for one relation to edit one table, loading processing of a module unit for a plurality of relations to edit the plurality of tables, and load processing of a module unit for all relations to edit all tables are performed (STEP S6).

Further, the display indicates the contents, while editing (STEP S7). Further, a recording operation is performed until receiving the completion of editing a directory unit (STEP S8). An updated condition is reflected on the recording operation and indicated on the display (STEP S9).

On the recording operations (STEP S8), a command of the record unit is inputted by the keyboard (STEP S10), and inserting processing (STEP 11) or removing processing (STEP S12) is performed according to the inputted command.

Next, the above-explained scanning processing and the location processing of records, the loading processing of a module unit, the inserting processing and the removing processing will be further explained to better understand features of a system according to the present invention.

Figure 14:
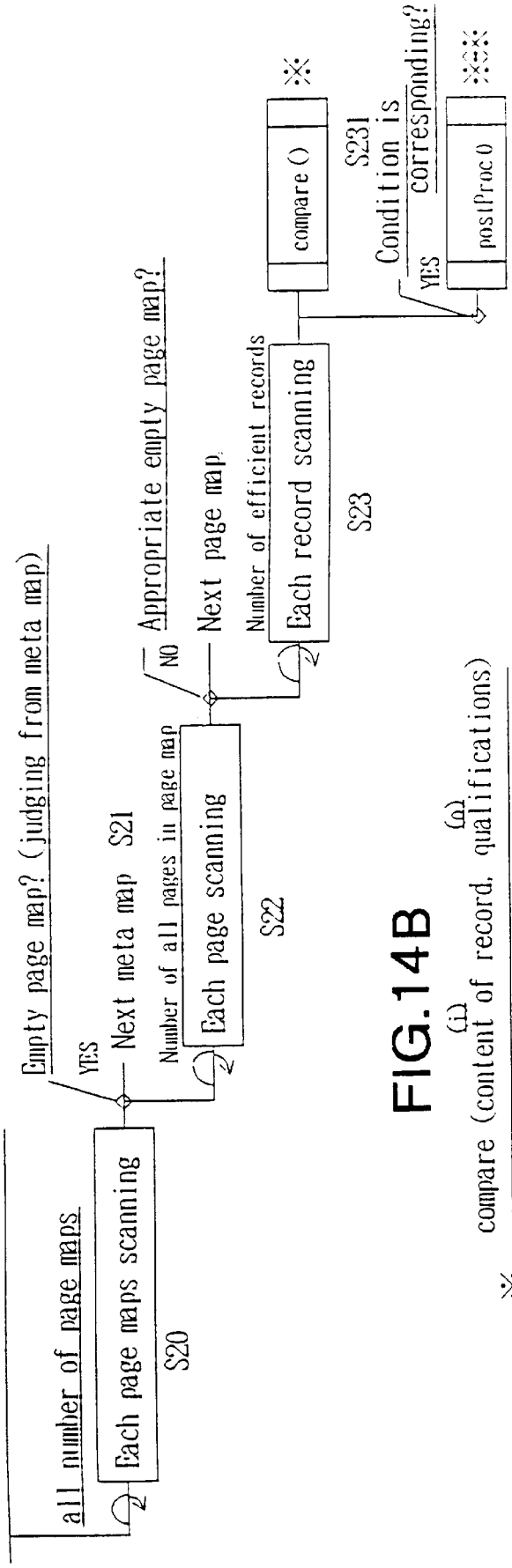
FIGS. 14A and 14B are flow charts of scanning records.

Scanning processing of records:

FIGS. 14A and 14B are flow charts of the scanning processing of records. In the scanning processing of records, all records in the same relation is scanned regardless of the relationship of master and slave relations. In other words, the scanning processing is performed in each page map for the number of all page maps (STEP S20).

It is judged whether or not the page map is empty according to the meta map (refer to FIG. 11). If it is an empty page map, the next meta map is referred (STEP S21).

If it is not an empty page map, the number of all pages in the page map is processed per a page (STEP S22). On the processing per a page, it is judged whether or not it is the appropriate relational page. If it is not the appropriate relational page, the next map page is processed. If it is the appropriate relation page, the efficient records are performed per a record (STEP S23).

On the processing per a record, the content of a record is compared with that of a key (STEP S231). On comparison processing (STEP S231), a post procedure (POST PROC) is performed, when meeting the qualifications (STEP S232). On the post procedure, the number of the record is added "1", and the content of records is stored in the application processing (A/P) area (refer to 60 shown in FIG. 10).

Figure 15:
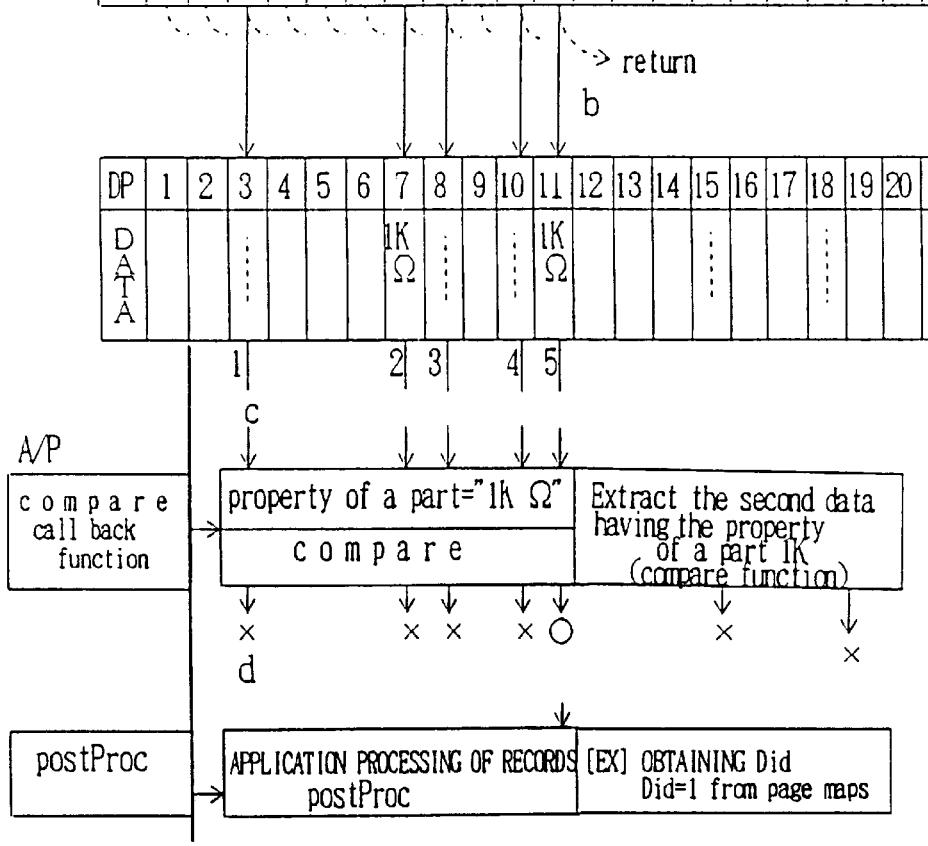
FIG. 15 illustrates detailed condition of data base on the step for scanning records.

FIG. 15 illustrates a detailed condition of a data base on a step for scanning records. In FIG. 15, symbols shown in drawings are defined as follows:

P: page map, EP: empty page number, DP: data page,
DI: main record/Rid, ER: empty record data,
R: relation ID=R1. pin, R2. portion, R3. symbol net, R4. net, R5. property of a part a of FIG. 15 shows that the meta map can determine a page map in which there are efficient pages. b of FIG. 15 shows that records in which the resistor R in corresponded are chosen in the page maps.

c of FIG. 15 shows that the chosen records are passed to a call back routine in the application processor (A/P) 60 to perform the comparison procedure (STEP S231).

d of FIG. 15 shows that the records, which are corresponding to the condition, are passed to a call back routine in the application processor (A/P) 60 to perform the post procedure (STEP S232).

Figure 16:
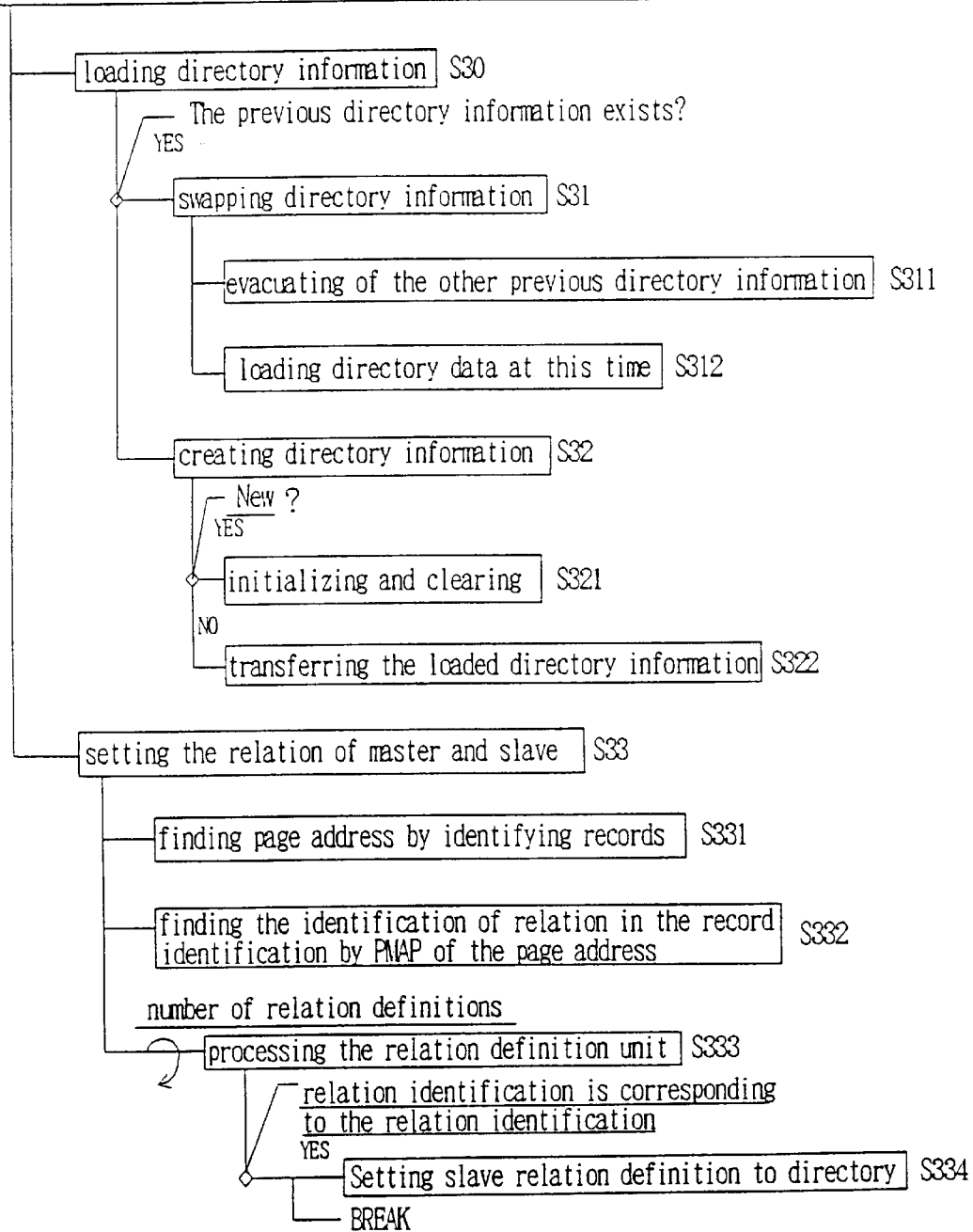
FIG. 16 is an operational flow chart of locating records.

FIG. 16 is an operation flow chart of locating modules. The application processor 60 gives a relation ID (Rid) for identifying the master record. Accordingly, the arithmetic processor 50 loads the corresponding directory information from the relation definition file 19, based on the Rid (STEP S30). Then, the loading of directory information is performed by using the Rid as a key, or directly coupling to the master record itself.

After then, the relation id of a master record becomes apparent from the above-described relation id (Rid) for identifying the master record, and the relationship of master and slave of relations becomes apparent from the relation definition, respectively. In other words, the relationship of master and slave relations can be obtained from the relationship between the relation ID and the relation definition by performing the processing of loading the Rid, the page address, and the page map in order.

Accordingly, the order of arrangement of address showing an empty record search starting page per a slave relation, the page location mask in the used page map table, the order of bits of the empty record location mask and the slave relation ID can council the directory information according to the relationship of master and slave relations.

Returning back to FIG. 16, a loading processing of directory information is performed (STEP S30). If there is the previous directory information, a swapping processing of directory information is performed (STEP S31). On the swapping processing of directory information, an evacuating processing of the other previous directory information is performed (STEP S311). Further, the loading of directory data at this time is performed (STEP S312).

If there is no previous directory information, a creating processing of directory information is performed (STEP S32). On the creating processing of directory information, if the directory information is new, initialization and clearing are performed (STEP S321), whereas the loaded directory information is transferred (STEP S322).

Meanwhile, according to the setting of the relationship of master and slave relations (STEP S33), the page address is found by identifying records (STEP S331). Further, the identification of relations for identifying records is obtained by the page map of the appropriate page address (STEP S332).

Then, the processing of a relation definition unit required for the number of relation definitions is performed (STEP S333). On this processing, it is judged whether or not the identification of relations is corresponding to the identification of the appropriate relations. If it is not corresponding to the identification of the appropriate relations, the slave relation definition is set on the directory information (STEP S334).

Figure 17:
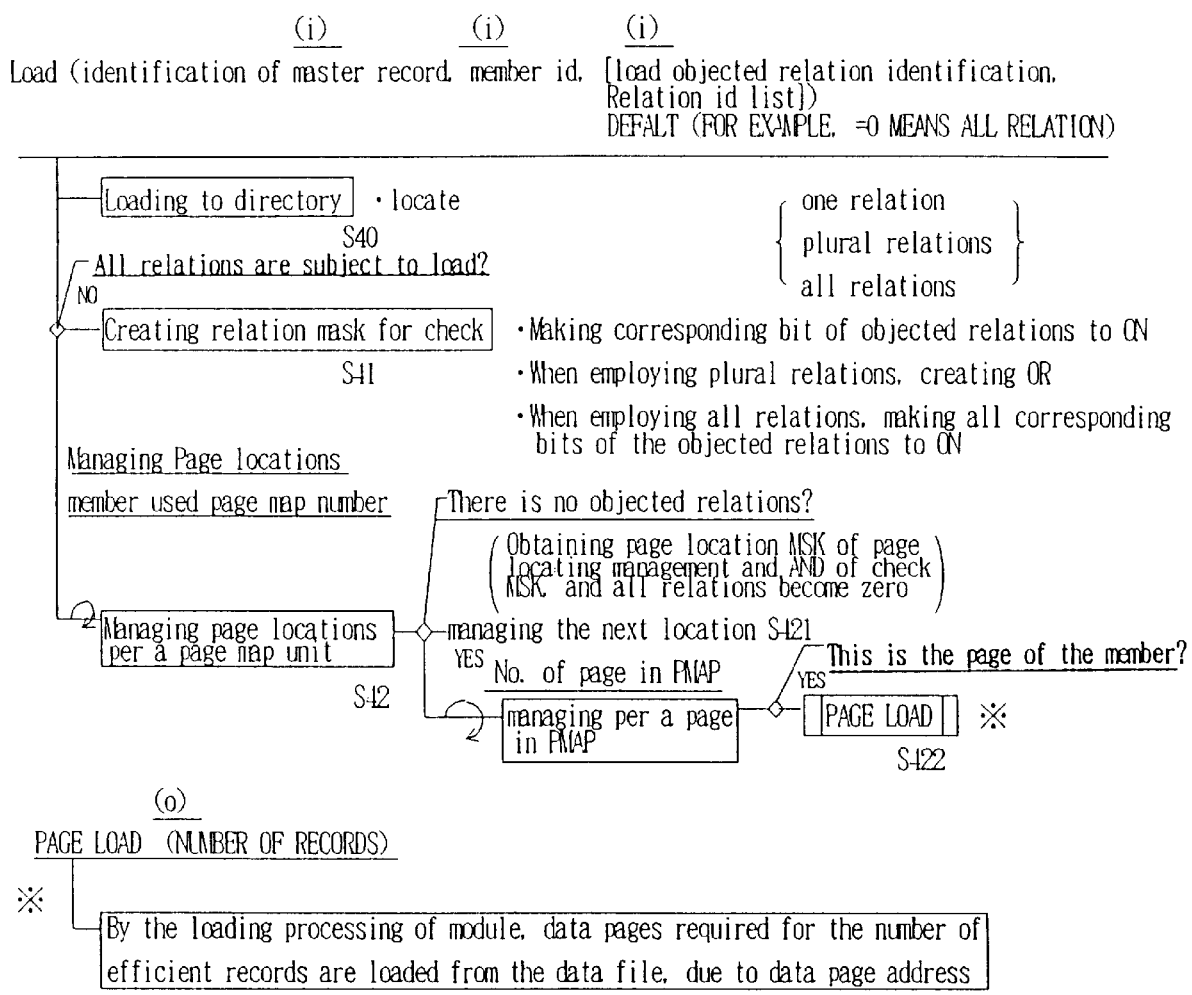
FIG. 17 is an operational flow chart of loading a module unit.

FIG. 17 is an operational flow chart of loading of a module unit. FIGS. 18 through 21 are relational diagrams showing the detailed condition on data base in the loading processing of a module unit.

The loading processing of a module unit, which is different from the scanning processing of records, is subject to load only the records belonging to the master record specified on the location processing. Loading one kind of relation, a plurality of relations or all kinds of relations, each of which has the relationship of master and slave can be selected as a kind of relation, which is subject to load.

The page storing records, which are subject to load, are specified from the table of page maps of the directory. The page map, which should be checked by the page location mask per a slave relation is specified according to the relation, which is subject to load. Further, the bit per a relation, which is subject to load, is made to ON "1". Then, it is apparent from the result of the bit mask obtained from a disjunction (OR) for the relations, which are subject to load, and a conjunction (AND) with the page location mask per a table of page map that all page maps are not zero.

Further, on the choosing processing of pages, which are subjects to load, in the page map, the correspondence with the elation ID and the master record ID should be checked.

To understand the above-described explanation, returning back to FIG. 17, the locating processing to the directory is performed at first (STEP S40). If all relations are not subject to load, a relation mask for check is created (STEP S41).

Then, the corresponding bit of the objected relations is made to ON "1". When employing a plurality of relations, a disjunction (OR) is created. Further, when employing all relations, all corresponding bits of the objected relations are made to ON "1".

Further, in FIG. 17, if all relations are subject to load, the page location management processing is performed per a page map unit (STEP S42). On the page location management processing, if there is no objected relations (when the page location mask of page location management and a conjunction (AND) of check mask are obtained, and all relations become zero), the next page location management processing is performed (STEP S421).

If there are the objected relations, the loading processing (STEP S422) of modules required for the number of pages in the page map is performed in each page of the page map. By the loading processing of modules, the data pages required for the number of efficient records are loaded from the data file, according to the data page address.

Referring now to FIGS. 18 through 21, the commonly employed symbols are defined as follows;

DI: directory,

PMAP: page map,

DP: data page

RMSK: used page location mask,

R: relation ID (refer to FIG. 11)

FIG. 18 shows an entire table illustrating a page location. "1" or "0" bit is denoted in the table of the used page location mask RMSK, according to the relation number.

FIG. 19 shows an entire table of a page map. In the table, each page map PMAP is expressed by a data page DP and a relation ID.

FIGS. 20A, 20B and 20C are diagrams for explaining a condition of loading a module in accompany with FIGS. 5 through 8. FIG. 20A shows a content of loading a directory relation part, FIG. 20B shows a content of loading a directory relation symbol, and FIG. 20C shows a content of loading a directory relation net.

Further, FIG. 21 shows a data page. In FIG. 21, the data page DP and the relation ID are shown in a table in corresponding to the page map.

Figure 22:
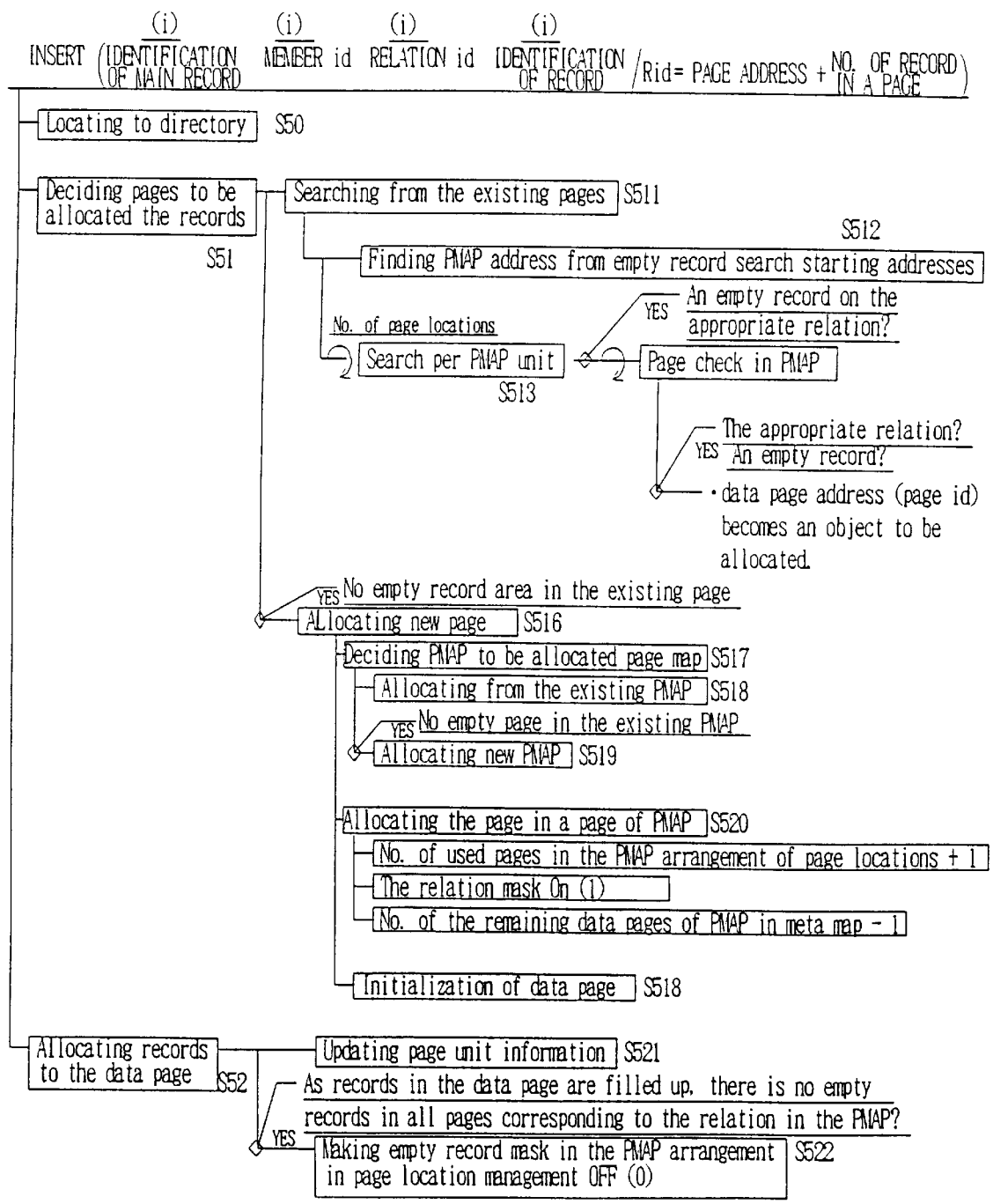
FIG. 22 is an operational flow chart of the insertion.

FIG. 22 is an operational flow chart of an inserting processing. The inserting processing is composed of the steps for locating to the directory (STEP S50), deciding a page to be allocated the records (STEP S51), and allocating records to the decided page (STEP S52).

The decision of the page to be allocated records (STEP S51) is separated to the case where the empty record area is searched from the existing pages, which have been already allocated (STEP S511) and the case where a new page is allocated when there is no empty record in the existing pages (STEP S516).

When the empty record area is searched from the existing pages (STEP S511), the page map address is found from the empty record search starting addresses of the empty record management (STEP S512), and then searching required for page locations is performed per a page map unit (STEP S513).

On the searching processing per a page map unit, if there is an empty record on the appropriate relation, the page check is performed in the page map until coming to immediately before the first record search starting address. As the result, if an empty data is found on the appropriate relation, the data page address (page ID) becomes an object to be allocated.

The allocation processing (STEP S516) of a new page is formed of two steps of deciding a page map, to which the new page is allocated (STEP S517) and allocating the page to the page map (STEP S520).

Further, the decision of the page map, to which the new page is allocated (STEP S517) is performed according to the currently used and existing table of page maps (STEP S518) or by checking a new page map with the meta map, when there is no empty page in the currently used page map (STEP S519).

On the processing for allocating records to the pages (STEP S52), the empty record information of the page unit information in the page map corresponding to the appropriate page is updated (STEP S521).

If there is no empty record area in the appropriate page due to the record insertion, and there is no empty record of all pages having the Rids of main records and the appropriate relation IDs on the page map (it is judged by checking page unit information on the appropriate page map), a mask showing that the empty record existence of the appropriate relation on the appropriate page map shown in the page map table, is made to OFF "0" (STEP S522).

Next, each step of the inserting processing (refer to the operational flow chart shown in FIG. 22) will be further explained.

FIG. 23 shows one example of the case where the empty record area is searched from the existing pages (STEP S511: refer to FIG. 22). In FIG. 23, the employed symbols are defined as follows;

PMAP: page map, RE: empty record management,
PE: page location management, DP: data page
R: relation, ER: empty record information
PMSK: page existence mask The processing is performed by searching the existing pages, which have a possible to have the empty record area, in order of the page map table, the page map, and existing page, subsequently, based on the directory information. If the records are filled with the page maps, it cannot be given an efficiency to always check from the heading of a table of the page map.

Then, a page map to be checked at first is decided according to the empty record search starting page address per a parental relation. In the table of the page map, it can be known whether or not there is a page having empty records in the appropriate page map, according to the empty record location mask expressed with a bit corresponding to each slave relation.

When the page map table is checked from the page map to be started to search to the last of the table, going back to the header of the page map table, checking is made from the header to the page map immediately before the original search starting page map.

With this bit mask, the existing page to be allocated records, is decided by searching the page having the relation ID, which is subject to locate the records from the appropriate page map, the appropriate main record ID, and the page having the empty record.

If the existing page to be allocated a new page is decided, the address of the empty record search starting page is updated to that of the existing page, eventually. Therefore, the searches are performed from the page address on the next inserting processing, too.

FIG. 24 shows an example of decision (refer to the step S516 shown in FIG. 22) according to the currently used page map table on the decision processing of the page map to be allocated a new page on the inserting processing. In FIG. 24, the same used symbol definitions shown in FIG. 23 are used to denote and identify corresponding definitions shown in FIG. 24. The definitions of new symbols used in FIG. 24 are as follows;

MM: meta map, DI: main record,
EP: empty page number, UP: the used page number

This processing is a core of the present invention. In this decision processing, the page, which stores the record groups relating each other is positioned closely, with a page map unit, and the page map allocating the page is decided so as not to disperse the page map itself at the utmost, which expresses the range of physical group to locate the page.

At first, a page map having at least one empty page is decided to be allocated pages from the currently used page map table. This condition can be found by referring to the meta map, without accessing to the page unit information in the actual page map.

Then, the page map having the largest number of the used pages per a page map is selected from the page maps having the empty pages. This causes a depopulation of the page maps, which are subject to allocate pages, as the allocation and releasing of pages according to the inserting processing and the removing processing of the records are repeated, so that the depopulated page map is removed.

FIG. 24, (a) and (b) are a meta map and a page location management, respectively. A page location management, which has empty pages, is selected from the meta map (refer to ① of FIG. 24).

The page maps 7 and 8 respectively have one empty page, which becomes the selected page. Then, in the page location management after selecting, the page location management having the largest number of the used page number is used as the decided page ② of FIG. 24).

Eight pages in the page map before retrieval (c of FIG. 24) are updated based on the decision page ③ of FIG. 24). In FIG. 24, the dotted section (d of FIG. 4) is updated. Then, the meta map and the page location management are updated as the dotted sections of e and f of FIG. 24, respectively ④ of FIG. 24.

FIGS. 25A to 25F show examples of the decision (refer to the step S519 of FIG. 22), from the page maps including empty pages, not from the currently used page map table on the decision of the page map to be allocated new pages on the inserting processing. In FIGS. 25A through 25F, the same symbols are used to denote corresponding components of FIG. 24.

Figure 25A:
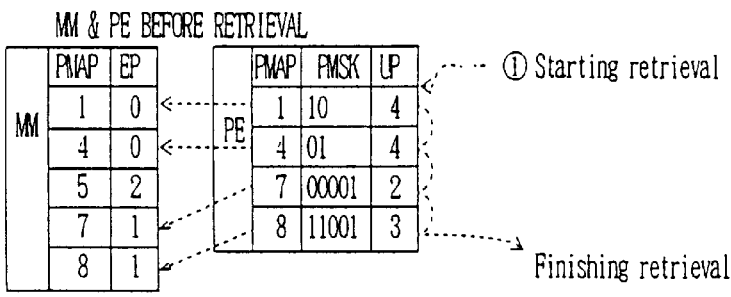
FIGS. 25A, 25B, 25C, 25D, 25E and 25F are diagrams showing a condition of no empty record on a page map of page location on the step of inserting processing.
Figures 25B, 25C, 25D, 25E, 25F:
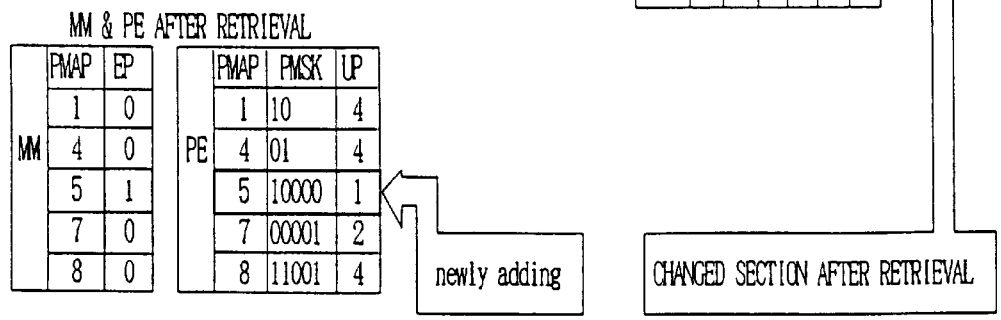

At first, the page location management PE having empty page numbers is selected from the meta maps MM ① of FIG. 25B). If there is no empty page, a page map having empty pages is searched from the meta map MM. In the example shown in ② of FIG. 25C, the page maps 5 having the empty page are retrieved. Then, the page map before retrieval as shown in FIG. 25D is changed as shown in FIG. 25E.

After then, as shown in FIG. 25F, the page map 5 is updated by newly adding to the meta map MM and the page existence management PE.

In the above-described case, in FIGS. 24 and 25A to 25F, the contents of processing to allocate pages in the page maps are performed on the following steps of:

i) Making (empty pages of the appropriate page map address −1) on the meta map.
ii) Further, turning the number of the used pages +1, the page existence mask per a relation, the empty record location mask to ON "1", for the arrangement of the appropriate page map of the page map table in the directory information.
iii) searching the empty pages from the page map, setting the relation ID and the main Rid, and resetting the empty record information as a page unit information.

FIG. 26 shows an operational flow chart of removing processing. As the same as other processing, the location processing of directory (STEP S60) should be performed.

The removing processing has the steps of deleting one record from the page (valid records −1), and updating the empty record information of the appropriate page in the page map (empty record number +1).

Further, the removing processing has the step of making the empty record mask of the appropriate page map, in which the page is located, to ON "1". More particularly, if the empty record occurs at the first time from all pages of the appropriate relations in the page map, there is a case where the mask has been already made to ON "1".

The removing processing is divided according to the result of deleting one record from the page as described above, as follows;

If there is no empty record (no valid record) in the page (STEP S61), the appropriate page information is deleted in the page map, one is added to the empty page number of the meta map, and one is subtracted from the used pages for the appropriate page map of page existence.

If the used page of page existence is empty (the used page number =0) (STEP S62), the arrangement of the appropriate page map of page existence is deleted. If there is no page of the relation in the page map (STEP S63), the page mask for the relation of the page map of page existence and the empty record mask are turned to OFF "0".

Figure 27:
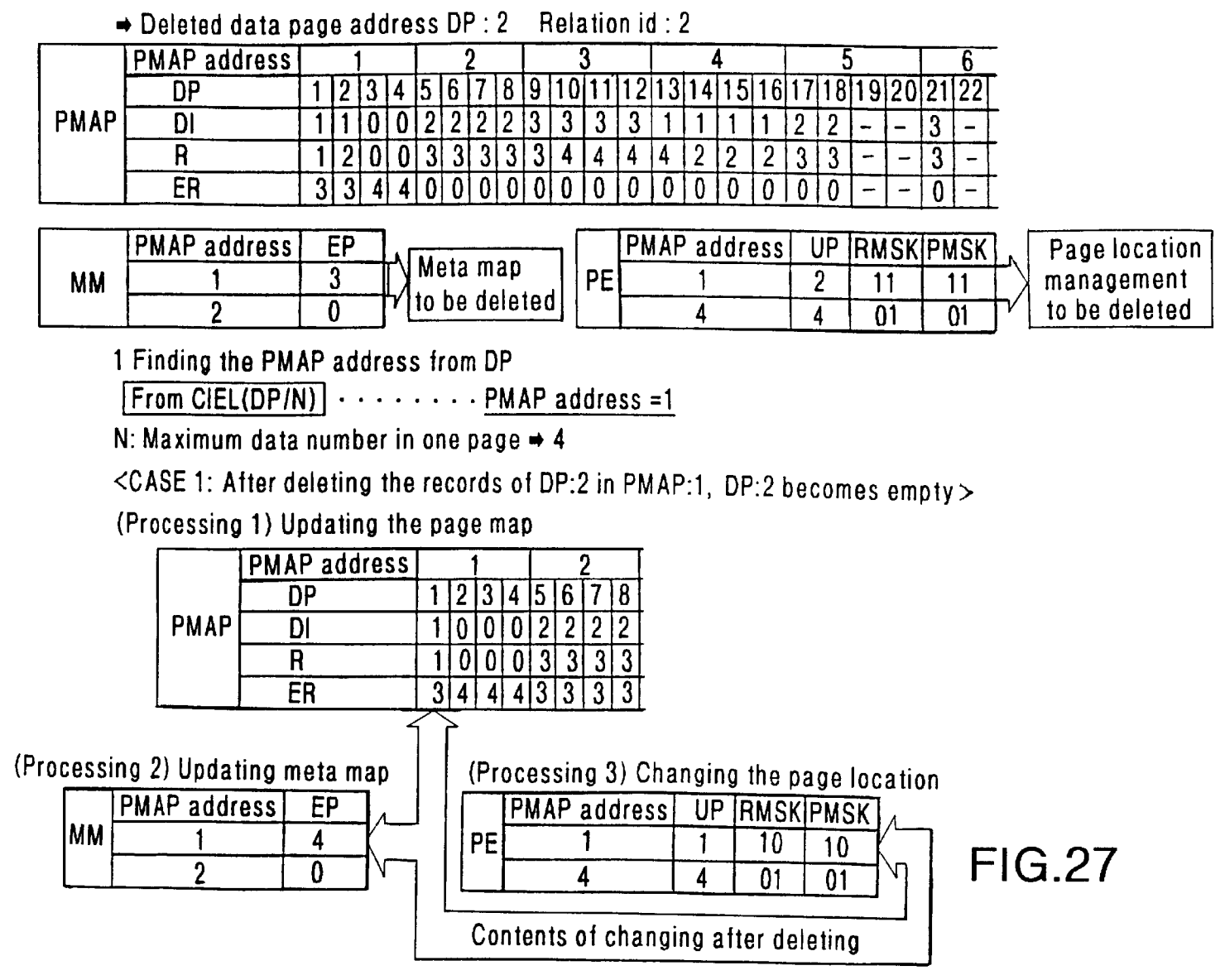
Figure 28:
FIG. 28 is a diagram (No. 2) showing a condition on the step of removing processing.
Figure 30:
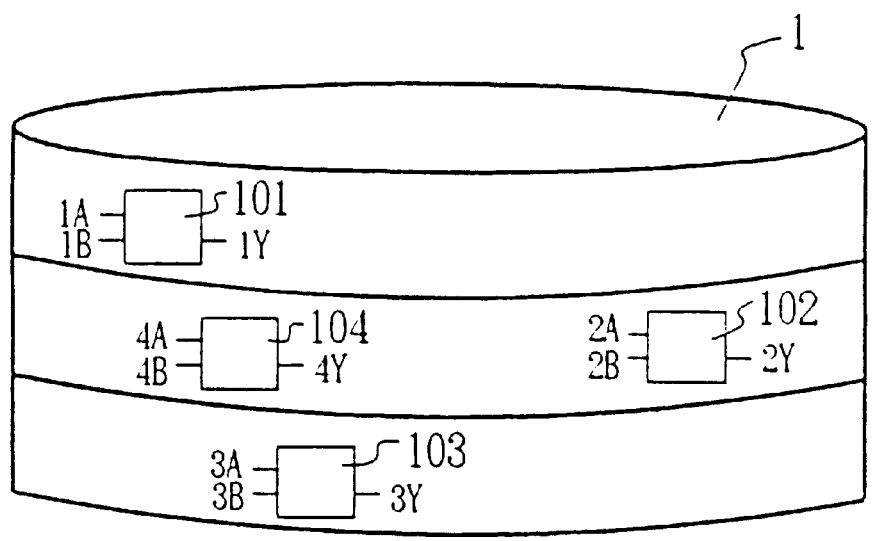
FIG. 30 is an explanatory diagram of storing data to a secondary data storage device in the prior art.

FIGS. 27 and 28 show the case where the empty occurs on the removing processing, and there is the page, which is subordinate to the main record. The definitions of symbols employed in FIGS. 25 are used to denote the corresponding symbols shown in FIGS. 27 and 28. Other symbols is added as:

RMSK: the empty record location mask.

On the conditions of the page map PMAP, the meta map MM, and the page management existence PE as shown in FIGS. 27 and 28, if the data page address DP, which is subject to delete, is 2 and the relation is 2, the meta map MM and the dotted section of the page management existence PE shown in the diagram are deleted.

That is, the page map address (PMAP address) is found by the data page address DP, which is subject to delete. The PMAP address becomes 1 by CEIL (DP/N). Eventually, the maximum number in one page becomes 4.

The case 1 shown in FIG. 27 shows the conditions of the page map PMAP, the meta map MM, and the page location management PE after deleting when DP=2 becomes empty, as the result of deleting the record of PMAP address=1K and DP=2.

The case 2 shown in FIG. 28, in comparison with the case 1 shown in FIG. 27, illustrates the condition of the page map PMAP, the meta map MM, and the page existence management PE after deleting when all of the employed data pages for the page maps in the page locations become empty. As is apparent from the condition, the number of used pages of the arrangement in the page map table becomes 0. Then, the arrangement of the page map is deleted from the page map table. The dotted section of the page existence management PE is moved up by the deletion, i.e., the section means an area of which the arrangement is decreased.

As explained in accompanying with the embodiments according to the present invention, the existence of pages and the existence of records are expressed by bit masks in the page map table of the directory data. However, it is also possible to manage with the number of used pages per a relation and the page number having the empty records instead.

In this case, the processing for checking the page unit information of all pages in the page map can be omitted on the inserting processing and the removing processing, when judging whether or not the bit masks showing the existence of pages per a relation in the page map table in the directory data and the existence of empty records are made to OFF "0" (it becomes 0 only by subtracting one from the page number).

However, the size of directory data becomes extremely large. For example, if 256 pages are recorded per a page map, the both page numbers per the relation require the eighth power of 2, i.e., the size more than 8 times in comparison with the expression with the use of bits. This size becomes larger according to the number of subordinate relations and the number of the employed page map addresses.

Further, there is also a drawback of increasing the overhead of bit arithmetic, when the page map having the relation, which is subject to load on the loading processing of the module unit, is selected.

In the above-described embodiment, although only one kind of relationship, such as parts and a subordinate property of a part, a portion and a pin, is explained as an example of the parental relationship, a plurality of parental relationships can be mixed in one data base, for example, a plurality of parental relationships, such as a symbol and a symbol terminal, and a net and path data of signal lines.

This is because the relationship of main and parental relations can be expressed per a relation, and the relationship per a relation in the directory data can be changed per a kind of the master relation. Therefore, it is easily to analyze the relations.

Further, in the above-described embodiments, for simplicity, the record length per an individual relation is fixed, and the directory information is stored in the another file. However, it is easy to extend such that a record having variable-length with database can be stored (the size is added per a record, and the remain size is added as an empty record data, respectively). Therefore, it is also easy to unit the directory information, which becomes to have variable-length, or extend such as to store it as other record in the same file.

As explained in accompanying with the above-described embodiments, the present invention can improve to clustering the page storing the records of a module unit by employing the page map information and the directory information that manages the information corresponding to the page map per a module unit.

Consequently, it also becomes possible to read the records of a module unit to the main data storage with a high speed. Further, the data records passed through the relations can be scanned by identifying the relations corresponding per a page in the page map information, without the directory information.

When scanning the records via relations and loading module unit, all of the record sets are subsequently read. However, it can be improved to retrieve frequently with SQL specification or retrieve with a high speed by managing the skimmer information per a relation definition, and together providing secondary index (B-tree, Hash or the like) according to the various kinds of key values.

What is claimed is:

1. A file storing system for managing a relational data base comprising:

a relation definition file for storing information of parental relationship representing a module between a parent relation and plural child relations belonging to the parent relation;

a data page file for storing parent data records of a parent relation, and child data records of Plural child relations belonging to the parent relation, respectively per a page unit;

a page map file for storing page map information, representing existence information of data pages and empty pages in the data page file, the data pages storing the parent data records, and the child data records and the module of the parent relation and the plural child relations belonging to the parent relation and having empty record areas reused as a valid record, and the empty pages having no record and being reused per a page unit;

a meta map file for storing information representing empty pages for each page map;

first means for managing the relation definition file and the data page file to manage the parental relationship and directory information per a module corresponding to a parent relation, the directory information expressing search starting information of empty records per a child relation for each module and an information table of a page map including a page belonging to a module, and the information table of a page map expressing a page map information identifier, the number of data pages and existence information of pages and empty records for each child relation;

second means for managing the data page file;

third means for managing the page map file;

fourth means for managing the meta map file; and fifth means for operating the first, second, third, and fourth means to perform inserting and removing parent data records, and child data records and modules, loading the child data records for a module to the data page file.

2. The file storing system according to claim 1, wherein the relation definition file, the data page file, the page map file, and the meta map file are stored in a secondary storage device, and there is further comprised of an arithmetic processing device for executing each managing function of the first means, the second means, the third means and the forth means.

3. The file storing system according to claim 1, wherein the page map file stores information for identifying that a page is unused, when the page is empty, and information for identifying a child relations and a module to which data stored in a corresponding page is belonging, when the page is used, and the third means selects a page belonging to child relations to be loaded, if the identification of a module to be loaded is not given when loading records belonging to one or more child relations in the fifth means, and selects the page belonging to the child relations and together the identification of modules to be loaded.

4. The file storing system according to claim 3, wherein the fourth means selects page map information for selecting the page to be loaded, excluding page map information composed of only the empty pages, when records are loaded belonging to one or more relations in the fifth means.

5. The file storing system according to claim 3, wherein the directory information in the first means includes a table of addresses of page map information including pages belonging to each module;

the page map table information has an address of the page map information in each page map information, and the first means defines the page map information, which selects the page to be loaded when loading the records belonging to each module in the fifth means, to one shown by the identification of the page map information in page map table information of the directory information.

6. The file storing system according to claim 5, wherein the information of the parental relationship in the first means expresses the identification of child relations belonging to each module in order, the page map table information of the directory information in the first means includes an information expressing the existence of the pages corresponding to the order of the child relations, the first means defines the page map information, which selects the page to be loaded when loading the records belonging to each module in the fifth means, to one shown by the identification of the page map information in which the page of the relations exists.

7. The file storing system according to claim 5, wherein the information of the parental relationship in the first means expresses the identification of child relations belonging to each module in order, the page map table information of the directory information in the first means has a bit flag for expressing the page existence corresponding to the order of subordinate relations, the bit flag showing 1 when existing pages, and 0 when there is no page, the first means further creates a bit mask corresponding to the order of child relations, when loading the records belonging to a module in the fifth means and loading the records belonging to child relations, the bit mask expressing 1 to the bit corresponding to the relation, and 0 to other bits, and defines page map information, which selects pages to be loaded, to one shown by the bit flag that expresses the existence of pages for each of the relations and the identification of the page map information, of which the result of conjunction (AND) of the bit mask corresponding to the relation.

8. The file storing system according to claim 1, wherein the page map file provides information showing the identification of that a page is empty, if the page is empty, and the identification of child relations and a module to which data stored in the page is belonging, if the page is used, the directory information in the first means includes a table information of addresses of page map information in which the page belonging to the module is included, the page map table information in the first means includes an address of the page map information for each page map information, the first means defines the page map information that selects the page to be loaded to one shown by the identification of the page map information in the page map table information of the directory information, when loading the records belonging to the specified module in the fifth means and all of the child relations, and the third means selects the pages belonging to the module identification as the pages to be loaded, regardless of the identification of child relations.

9. The file storing system according to claim 1, wherein the page map file has information for expressing the identification of that the page is empty, if the page is empty, and the identification of child relations and a module to which data stored in the page is belonging to, if the page is used, the third means inserts the records belonging to a specified module in the fifth means and one relation in the page, if there is an record area in the page by searching existing page belonging to the module and the relation, and the third means searches the empty pages, records the identification of the child relations and the module to the page map information corresponding to the empty page, allocates the information as a new page, and insert the records to the new page.

10. The file storing system according to claim 9, wherein the page map file includes the information of the empty record in the used page, and the third means searches existing pages belonging to the modules and the relations, and judges whether or not there is an empty record area in the searched existing pages, without actually accessing to the data page file, when searching the existing page on the inserting processing of the records in the fifth means.

11. The file storing system according to claim 9, wherein the directory information in the first means includes table information of addresses of the page map information including the pages belonging to the modules and the page map table information includes addresses of the page map information in each page map information, and the first means defines the page map information for selecting the existing page to information shown by the identification of the page map information of the page map table information of the directory information.

12. The file storing system according to claim 11, wherein the information of the parental relationship in the first means expresses the identification of child relations belonging to each module in order, the page map table information in the directory information of the first means further includes a empty record searching starting information corresponding to the order of the child relations, and the first means defines the information to the page map information for extracting existing pages to the page map information shown by the identification of the page map information of the page map table information of the directory information until coming to immediately before the record from the location showing the empty record searching starting information corresponding to the relation.

13. The file storing system according to claim 11, wherein the information of the parental relationship in the first means expresses the identification of child relations belonging to each module in order, the page map table information in the directory information of the first means further includes information showing the existence of empty records corresponding to the order of the child relations, and the first means defines the page map information in which the empty records exist to the information shown by the identification of the page map information of the page map table information in the directory information, based on the empty record existence information corresponding to the relation, when searching the existing page in inserting the record in the fifth means.

14. The file storing system according to claim 11, wherein the information of the parental relationship in the first means expresses the identification of child relations belonging to each module, the page map table information in the directory information of the first means further includes an information showing the empty record searching starting information and the empty record existence, and the first means defines page map information for selecting the existing page to the page map information shown by the identification of the page map information of the page map table information of the directory information.

15. The file storing system according to claim 9, wherein the third means defines the page map information having the empty pages, when searching the empty page for allocating a new page in inserting the records in the fifth means.

16. The file storing system according to claim 15, wherein the directory information in the first means includes table information of the page map information including pages belonging to modules and the page map table information includes addresses of the page map information for each page map information, and the first means defines the page map information for selecting empty pages to the page map having the empty pages in the fourth means from the information shown by the identification of the page map information of the page map table information of the directory information, searches the empty page according to the page map information if there is any page map information having empty pages, defines the page map information having the empty pages by the fourth means, and searches the empty page by the page map information, when searching the empty pages for allocating a new page on the step of inserting the records in the fifth means.

17. The file storing system according to claim 16, wherein the page map table information in the directory information of the first means further includes the number of the currently used pages belonging to the modules, and the first means defines the page map information for selecting the empty pages to the page map having the empty pages in the fourth means from the information shown by the identification of the page map information of the page map table information of the directory information, searches the empty page according to the page map information if there are any page map information having empty page, defines the page map information having empty pages by the fourth means, and searches the empty page by the page map information, when searching the empty pages for allocating a new page on the step of inserting the records in the fifth means.

18. The file storing system according to claim 1, wherein the page map file expressing the condition of each pages provides an information showing the identification that the page is empty if the page is empty, and the identification of child relations and a module to which data stored in the pages are belonging, if the page is used, and the third means extracts the page address, to which the record according to a record address to be deleted, and obtains the identification of the child relations and the module to which the record is belonging by the page map information corresponding to the page address, when deleting records in the fifth means.

* * * * *